United States Patent
Wettlaufer et al.

(10) Patent No.: US 10,939,696 B2
(45) Date of Patent: *Mar. 9, 2021

(54) JUICE PRESS APPARATUS AND METHODS

(71) Applicant: Goodnature Products, Inc., Orchard Park, NY (US)

(72) Inventors: Dale Wettlaufer, Sarasota, FL (US); Eric Wettlaufer, West Falls, NY (US)

(73) Assignee: Goodnature Products, Inc., Orchard Park, NY (US)

( * ) Notice: Subject to any disclaimer, the term of this patent is extended or adjusted under 35 U.S.C. 154(b) by 458 days.

This patent is subject to a terminal disclaimer.

(21) Appl. No.: 15/845,707

(22) Filed: Dec. 18, 2017

(65) Prior Publication Data

US 2018/0103676 A1 Apr. 19, 2018

Related U.S. Application Data

(63) Continuation of application No. 14/735,929, filed on Jun. 10, 2015, now Pat. No. 9,844,229.

(Continued)

(51) Int. Cl.
*B30B 9/26* (2006.01)
*B30B 9/06* (2006.01)
(Continued)

(52) U.S. Cl.
CPC ............... *A23N 1/00* (2013.01); *B30B 9/045* (2013.01); *B30B 9/06* (2013.01); *B30B 9/262* (2013.01)

(58) Field of Classification Search
CPC ........... B30B 9/04; B30B 9/045; B30B 9/262; B30B 9/06; A23N 1/00; B65G 65/00; B65D 1/34
(Continued)

(56) References Cited

U.S. PATENT DOCUMENTS 18,895 A 12/1857 Eiberweiser
194,457 A 8/1877 Newsam
(Continued)

FOREIGN PATENT DOCUMENTS

CH 359346 12/1961
CN 201115592 9/2008
(Continued)

OTHER PUBLICATIONS

Extended European Search Report dated Jun. 25, 2018 in European Patent Application No. EP15806585.4.
(Continued)

*Primary Examiner* — Jimmy T Nguyen
(74) *Attorney, Agent, or Firm* — Knobbe, Martens, Olson & Bear LLP

(57) ABSTRACT

A juice pressing machine and methods for pressing juice from a foodstuff includes embodiments having a removable pressing chamber and one or more filters which may be assembled and loaded with macerated foodstuff to form thin layers separated by a pressing plate. Once a juicing operation has been completed, the pressing chamber can be removed from the machine for emptying the pressed filters and solids contents therein. The empty pressing chamber may then be rinsed if needed and reattached to the machine for a subsequent pressing operation with newly filled filter(s). The platen may also be easily removed from the machine for cleaning as desired.

21 Claims, 38 Drawing Sheets

Related U.S. Application Data

(60) Provisional application No. 62/010,777, filed on Jun. 11, 2014, provisional application No. 62/105,159, filed on Jan. 19, 2015, provisional application No. 62/126,090, filed on Feb. 27, 2015.

(51) Int. Cl.
 *A23N 1/00* (2006.01)
 *B30B 9/04* (2006.01)

(58) Field of Classification Search
 USPC ........ 100/110, 113, 115, 123, 130, 131, 136, 100/245, 246, 247, 248; 99/495
 See application file for complete search history.

(56) References Cited

U.S. PATENT DOCUMENTS

| | | | |
|---|---|---|---|
| 241,348 A | 5/1881 | Gilbert | |
| 250,979 A | 12/1881 | Russell | |
| 260,542 A | 7/1882 | Dannecker | |
| 630,669 A | 8/1899 | Green | |
| 729,807 A | 6/1903 | Stoveken et al. | |
| 929,717 A | 8/1909 | Self | |
| 982,516 A | 1/1911 | Marks | |
| 1,130,701 A | 3/1915 | Berrigan | |
| 1,131,032 A | 3/1915 | Berrigan | |
| 1,456,257 A | 5/1923 | Stevenson | |
| 1,841,413 A | 1/1932 | Macchia | |
| 2,022,679 A | 12/1935 | Leo | |
| 2,068,013 A | 1/1937 | Fridlender et al. | |
| 2,087,435 A | 7/1937 | Hubbert | |
| 2,416,043 A | 2/1947 | Bucher-Guyer | |
| 2,612,100 A | 9/1952 | Bates | |
| 3,032,087 A | 5/1962 | Rodwick | |
| 3,154,122 A | 10/1964 | Batchelor et al. | |
| 3,162,384 A | 12/1964 | Wright | |
| 3,334,790 A | 8/1967 | Eaton | |
| 4,191,103 A | 3/1980 | Wettlaufer | |
| 4,214,519 A | 7/1980 | Stollenwerk et al. | |
| 4,367,667 A | 1/1983 | Shibata | |
| 4,393,737 A | 7/1983 | Shibata | |
| 4,420,404 A | 12/1983 | Coate et al. | |
| 4,456,185 A | 6/1984 | Ribassin et al. | |
| 4,539,793 A | 9/1985 | Malek | |
| 4,674,690 A | 6/1987 | Ponikwia et al. | |
| 4,680,808 A | 7/1987 | Paleschuck | |
| 4,730,555 A * | 3/1988 | Blanchot | B30B 9/06 100/127 |
| 4,778,117 A | 10/1988 | Karg | |
| 4,892,665 A | 1/1990 | Wettlaufer | |
| 4,986,912 A | 1/1991 | Fisch | |
| 5,031,524 A | 7/1991 | Wettlaufer | |
| 5,045,186 A | 9/1991 | Takashima | |
| 5,146,848 A * | 9/1992 | Dufour | B30B 9/067 100/110 |
| 5,205,498 A | 4/1993 | Ostermeier et al. | |
| 5,207,152 A * | 5/1993 | Wettlaufer | A23N 1/02 100/116 |
| 5,267,509 A | 12/1993 | Wettlaufer | |
| 5,275,097 A | 1/1994 | Wettlaufer | |
| 5,340,036 A | 8/1994 | Riley | |
| 5,356,083 A | 10/1994 | Wettlaufer | |
| 5,533,681 A | 7/1996 | Riley | |
| 5,613,434 A * | 3/1997 | Hartmann | B30B 9/22 100/37 |
| 6,123,018 A | 9/2000 | Wettlaufer et al. | |
| 6,159,527 A | 12/2000 | Wettlaufer | |
| 6,422,138 B1 | 7/2002 | Ballard | |
| 6,457,403 B1 | 10/2002 | Wettlaufer et al. | |
| 7,337,996 B2 | 3/2008 | Hanson et al. | |
| 7,448,317 B2 | 11/2008 | Pinnow | |
| 7,607,599 B2 | 10/2009 | Jara-Almonte et al. | |
| 7,753,297 B2 | 7/2010 | Hanson et al. | |
| 7,866,583 B2 | 1/2011 | Jara-Almonte | |
| 8,387,520 B2 | 3/2013 | Backus | |
| 8,578,846 B2 | 11/2013 | Sherwood | |
| 9,027,472 B2 | 5/2015 | Bertocchi | |
| 9,763,470 B2 | 9/2017 | Feinberg et al. | |
| 9,844,229 B2 * | 12/2017 | Wettlaufer | B30B 9/045 |
| 9,888,802 B2 | 2/2018 | Holzbauer et al. | |
| 2008/0098908 A1 | 5/2008 | Song | |
| 2008/0116305 A1 | 5/2008 | Hanson et al. | |
| 2012/0037013 A1 | 2/2012 | Bertocchi | |
| 2013/0074708 A1 | 3/2013 | Asbury et al. | |
| 2014/0224137 A1 | 8/2014 | Wettlaufer et al. | |
| 2014/0306042 A1 | 10/2014 | Chesack et al. | |
| 2014/0314918 A1 | 10/2014 | Wettlaufer et al. | |
| 2015/0257435 A1 | 9/2015 | Feinberg et al. | |
| 2015/0359256 A1 | 12/2015 | Wettlaufer et al. | |
| 2015/0374025 A1 | 12/2015 | Evans et al. | |
| 2017/0295982 A1 | 10/2017 | Holzbauer et al. | |
| 2018/0084818 A1 | 3/2018 | Wettlaufer et al. | |
| 2019/0159507 A1 | 5/2019 | Wettlaufer et al. | |
| 2019/0193359 A1 | 6/2019 | Wettlaufer et al. | |

FOREIGN PATENT DOCUMENTS

| | | |
|---|---|---|
| CN | 201 245 539 Y | 5/2009 |
| CN | 201604303 | 10/2010 |
| CN | 202515365 | 11/2012 |
| CN | 205727969 | 11/2016 |
| EP | 1364558 | 3/2005 |
| EP | 1632338 | 3/2006 |
| FR | 2 806 880 A1 | 10/2001 |
| JP | 2006-094902 | 4/2006 |
| JP | 2015039493 | 3/2015 |
| KR | 20030004642 | 1/2003 |

OTHER PUBLICATIONS

Norwalk. 2014. Model 280 Features. Retrieved on Oct. 9, 2015 from http://wwww.norwalkjuicers.com/features/.

Norwalk. 2014. Model 280 Technical Specifications. Retrieved on Oct. 9, 2015 from http://wwww.norwalkjuicers.com/technical-specs/.

International Search Report and Written Opinion dated Sep. 3, 2019 in International Application No. PCT/US2015/035139.

International Search Report and Written Opinion dated Sep. 3, 2015 in International Application No. PCT/US2015/035139.

International Search Report and Written Opinion dated Mar. 22, 2019 in International Application No. PCT/US2018/063370.

International Preliminary Report on Patentability in International Application No. PCT/US2018/063370, dated Jun. 2, 2020.

* cited by examiner

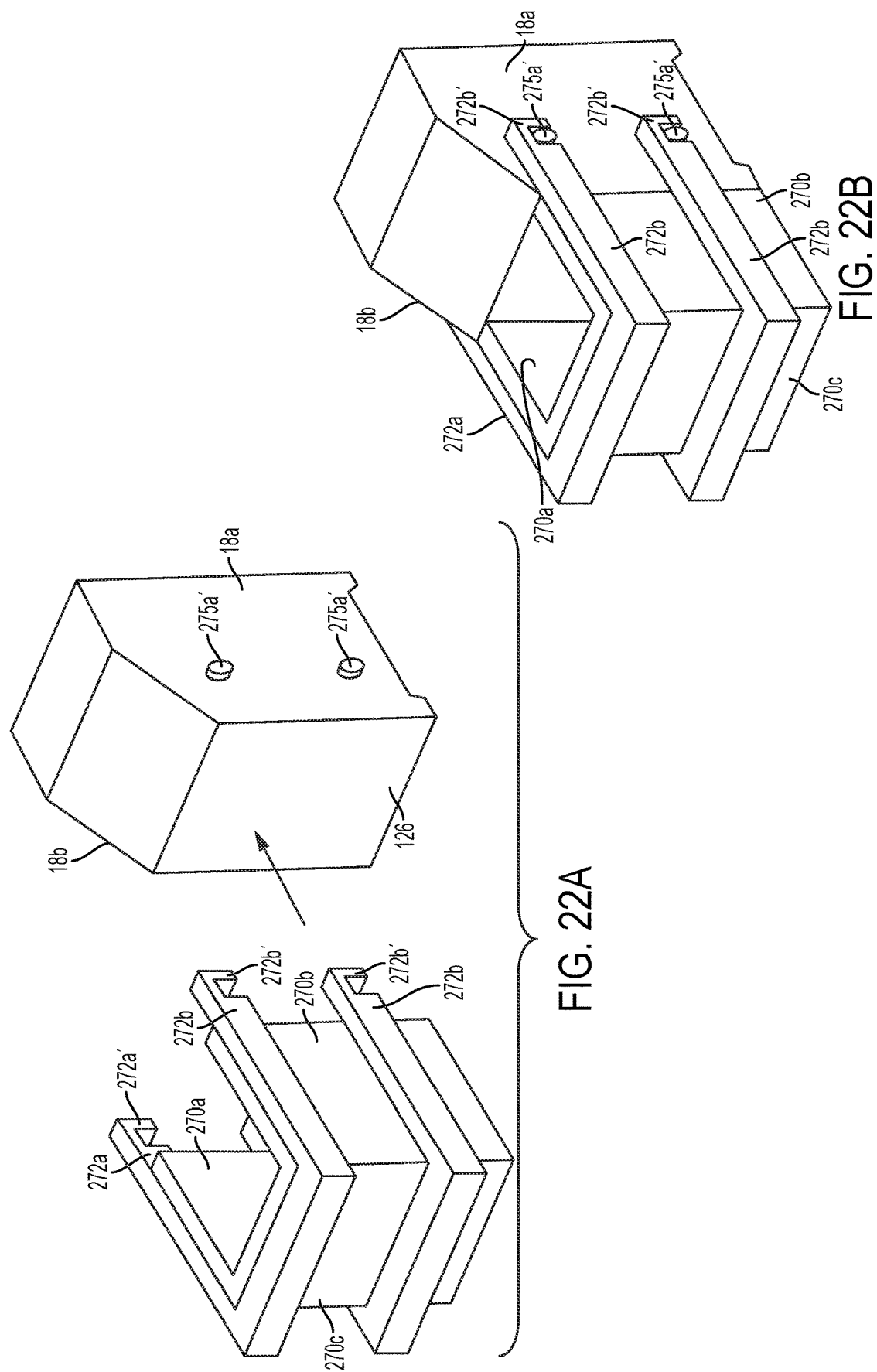

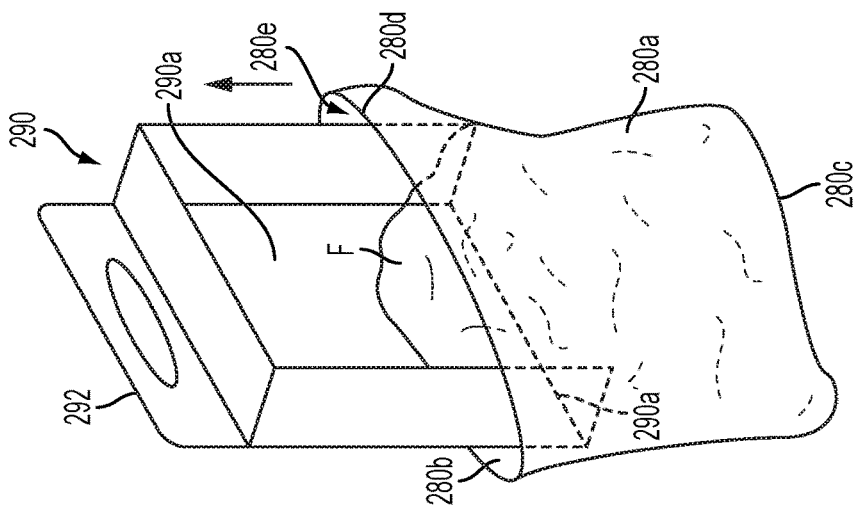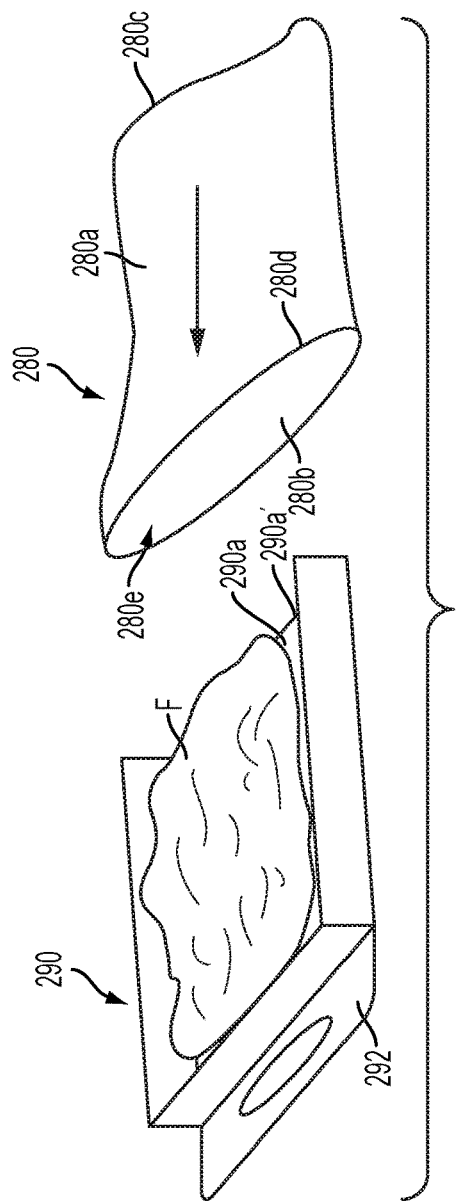
FIG. 30
FIG. 29

JUICE PRESS APPARATUS AND METHODS

This application is a continuation of U.S. patent application Ser. No. 14/735,929 filed on Jun. 10, 2015, which claims the benefit of U.S. Provisional Application Ser. No. 62/010,777 filed on Jun. 11, 2014, U.S. Provisional Application Ser. No. 62/105,159 filed on Jan. 29, 2015, and U.S. Provisional Application Ser. No. 62/126,090 filed on Feb. 27, 2015, all of which are incorporated by reference in their entireties.

BACKGROUND OF THE INVENTION

The present invention relates to apparatus and methods for pressing juice from a foodstuff.

Pressing juice from a foodstuff has been known for centuries and has recently seen an increase in interest due to the documented health benefits of drinking juice pressed from foodstuffs such as vegetables, fruits and nuts, for example. There are many types of machines for pressing juice, from extremely large industrial machines to smaller counter-top machines. Some machines can process juice on a continuous line basis while others can process juice on a batch basis.

In its most basic form, juice pressing may involve the cutting or reduction of size of the foodstuff (typically called "maceration") so as to increase the surface area of the food pieces which increases accessibility of the plant cells containing the juice. The macerated foodstuff is then placed in the machine which includes some type of press to compress the macerated foodstuff which causes the cells to break open and release the juice. The juice is separated from the pressed solids (typically called "cake" or "pomace").

It is desirable to extract as much juice as possible from the foodstuff in the shortest time possible while also minimizing machine downtime. It is furthermore desirable to minimize the time between juice making batches in a batch type pressing machine. It is yet furthermore desirable to have a pressing machine which prevents or at least minimizes travel of the solids and/or juice from the pressing chamber to other parts of the machine. It is even furthermore desirable to have a design which simplifies the cleaning of the machine in between juicing operations. While juice pressing machines have been developed that attempt to address these desired features, there remains much room for improvement. A need therefore remains for an improved juice pressing machine that addresses and meets all of these desired features.

SUMMARY OF THE INVENTION

In a first aspect, the present invention provides a juice pressing machine having a platen which moves between retracted and extended positions. A pressing chamber is provided which is easily removable from the machine for emptying the pressed foodstuff therefrom between successive juicing operations. Foodstuff which preferably has been first macerated may be held in one or more permeable pressing filters. A filter may comprise an individual panel of material or be assembled into a defined form such as a bag, for example. The one or more filters are placed in the pressing chamber and the platen is moved to the extended position within the pressing chamber. As the platen pushes against the one or more filters and foodstuff, the foodstuff and filter(s) move toward the back wall of the pressing chamber and are pressed between the chamber back wall and platen.

The chamber preferably includes opposing side wall surfaces thereof which act to support and restrain the opposite sides of the pressing filter(s) which are exposed along the opposite sides of the platen. This makes possible the use of a lighter weight pressing filter since the risk of the filter rupturing due to pressure exerted on an unsupported filter surface during pressing is likewise reduced. Use of lighter weight filters is desirable in that the cost of the pressing filter is reduced to the point where the filters may be considered disposable, much like a paper coffee filter.

In a preferred embodiment, the side wall surfaces of the pressing chamber include grooves or other features which direct juice flow toward a juice outlet. The chamber back wall and/or platen and/or other pressing surfaces may include vertically extending grooves or other features which direct juice to the juice outlet which may be located at the bottom of the pressing chamber.

Once a juicing operation has been completed, the pressing chamber can be removed from the machine for emptying the pressed filters and solids contents therein. The empty pressing chamber may then be rinsed if needed and reattached to the machine for a subsequent pressing operation with newly filled filters. The platen may also be easily removed from the machine for cleaning as desired.

In another aspect, the invention provides an innovative funnel having a neck of a length which allows the user to mount an empty pressing filter thereon with the sides of the funnel neck covering substantially all the side walls of the filter from the bottom to the open top thereof. The bottom wall of the filter is not covered as it is located at the open end of the funnel neck opposite the upper hopper end thereof. With the filter and funnel placed inside the pressing chamber, the user may then fill the funnel neck with macerated foodstuff. During this time the filter side walls remain substantially covered by the funnel neck side walls and hence dry. Once the funnel neck is filled with macerated foodstuff, the user simply lifts the funnel out of the pressing chamber while leaving the filled filter in the chamber and ready for a pressing operation.

The close fit between the funnel neck and the fully open filter allow removal of the funnel from the filter without any appreciable movement of the macerated foodstuff in the filter. It is important that movement of the macerated food stuff within the filter is minimized and also that the side walls of the filter remain dry prior to the pressing operation. This is because any movement of the foodstuff and/or wetness of the filter can cause weakness in the lightweight fabric and adversely affect the structural integrity of the filter leading to rupture. The filling of the filter via the full filter length funnel neck allows a thin and substantially even width layer of foodstuff to be formed as the funnel/filter is filled which is not disturbed as the funnel is removed from the filter. Without the funnel neck keeping the filter side walls stationary and dry, the foodstuff and/or filter could otherwise tumble upon itself, causing an uneven layer width and hence an uneven pressing profile across the length of the foodstuff layer, and also wet the filter which greatly increases the chance of filter structural failure prior to the pressing operation. The full filter length funnel neck also allows for a thinner layer of macerated foodstuff to be pressed which is desirable in that a lower pressing pressure may be used to extract much more juice from the foodstuff than would be required with thicker layers of foodstuff in the pressing area. In thicker layers of foodstuff, juice extraction from the middle layer is very difficult and does not yield as much juice than the foodstuff located at the opposite outer layers which are directly engaged by respective pressing surfaces.

The funnel includes at least one but more preferably two or more necks in spaced, side-by-side relation to one another such that two pressing filters may be filled and placed in the pressing chamber to increase the amount of juice production in a single pressing operation. In yet a further preferred embodiment, a pressing plate is positioned between the necks prior to depositing the funnel and mounted filters into the pressing chamber. Thus, once the funnel is removed from the filters the pressing plate is positioned between and directly engages the facing surfaces of the two filters. The pressing plate preferably includes grooves or other features configured to direct extracted juice toward the pressing chamber juice outlet.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein:

FIGS. 22A and 22B are assembled and unassembled perspective views; respectively, of another embodiment of a juice pressing machine in accordance with the invention;

FIG. 29 is a perspective view of another embodiment for filling a filter with macerated foodstuff;

FIG. 30 is a perspective view of the embodiment of FIG. 29 showing the macerated foodstuff being transferred from the tray to the filter;

DETAILED DESCRIPTION OF PREFERED EMBODIMENTS

Figure 1:
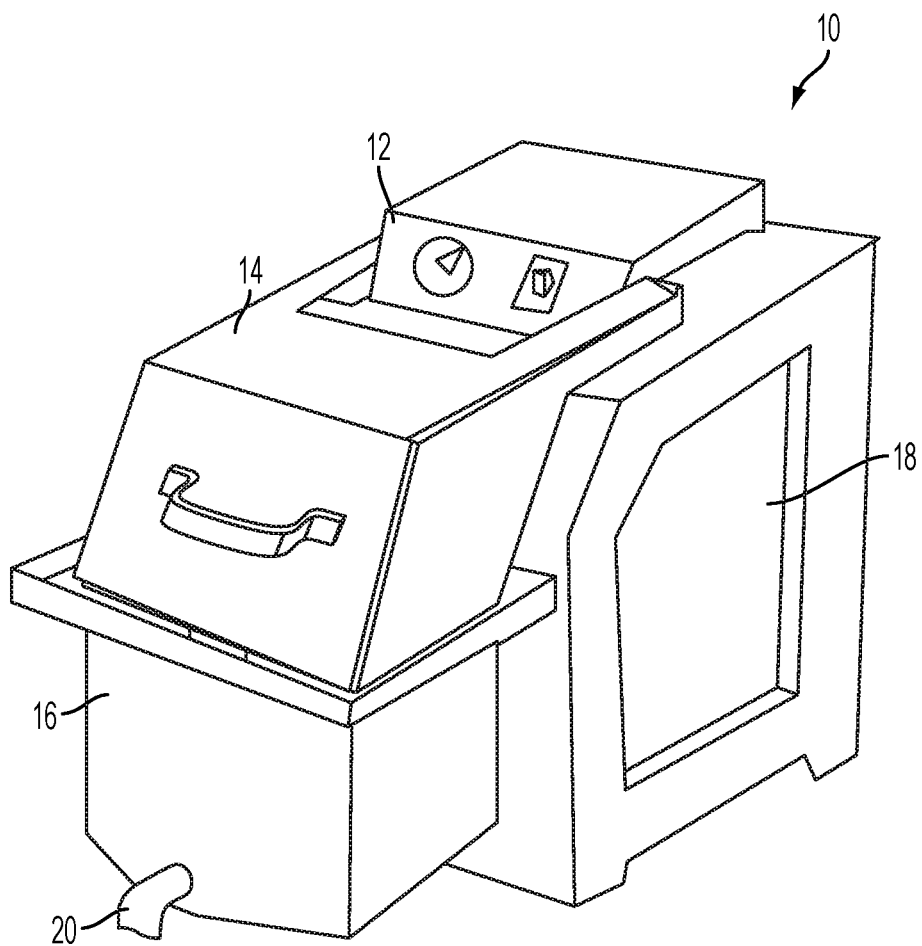
FIG. 1 is a perspective view of one possible embodiment of a juice pressing machine in accordance with the invention.

Referring now to the drawing, there is seen in FIG. 1 one possible embodiment of the outer housing of a juice pressing machine 10 having a control panel 12, hinged lid 14, juice compartment 16 and machine component compartment 18. The juice compartment 16 may include a spigot 20 for dispensing extracted juice from the machine 10. Machine 10 is an exemplary embodiment of a juice pressing machine designed as a counter-top model which may be used in the home or small businesses, although it is understood that the teachings of the present invention may be scaled to larger pressing machines designed for industrial juice pressing operations.

Figure 2:
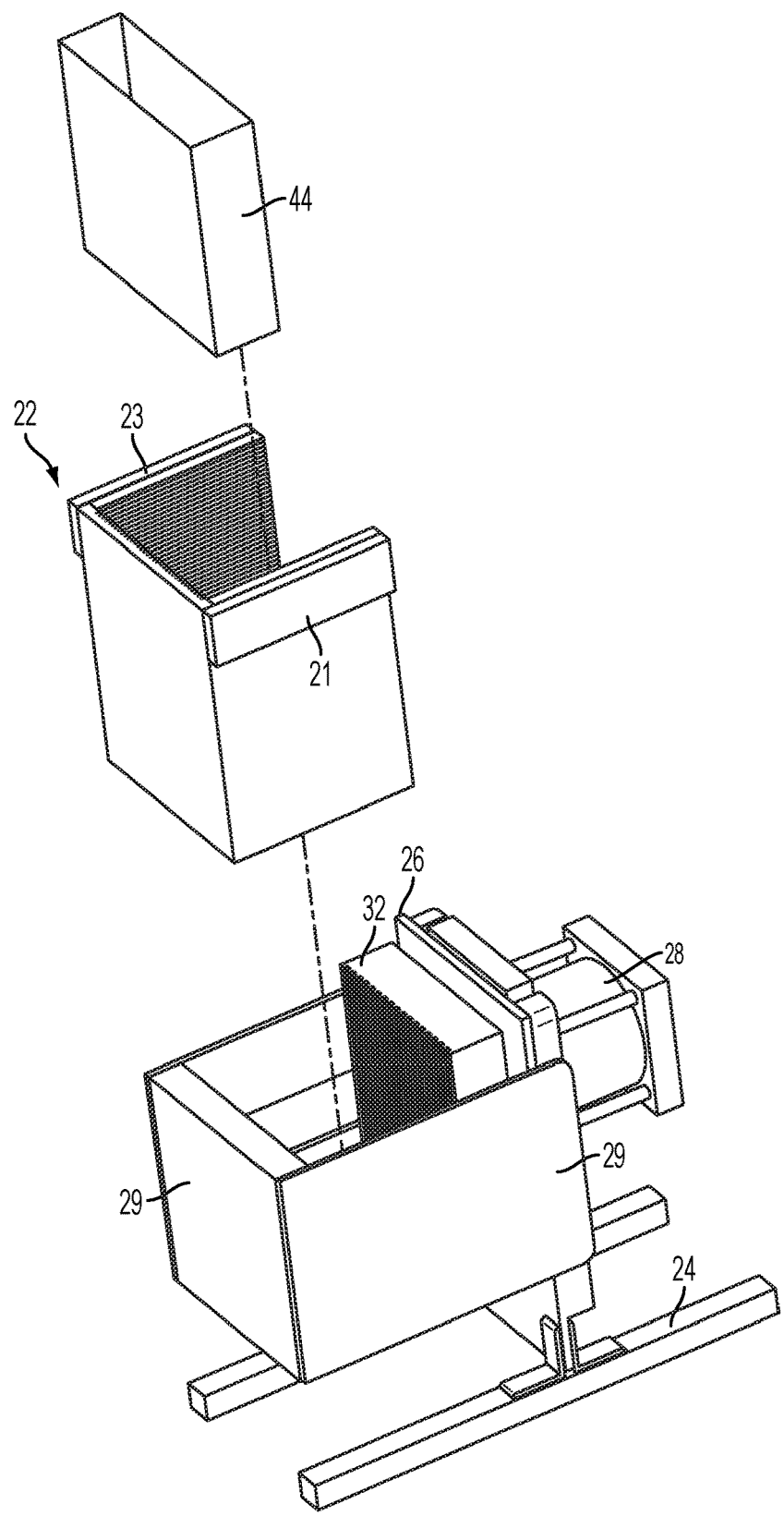
FIG. 2 is a perspective view of another embodiment of juice pressing machine and shown without an outer housing showing the filter, pressing chamber and pressing chamber support in spaced relation to the interior of the pressing machine.
Figure 5C:
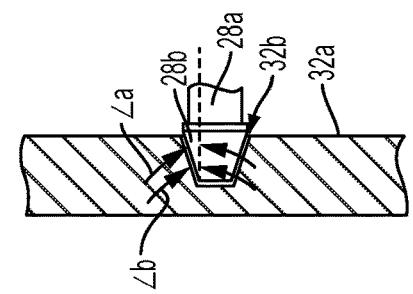
FIG. 5C is a fragmentary, cross-sectional view showing the interface between the end of the pushing rod and the recess of the platen.
Figure 5B:
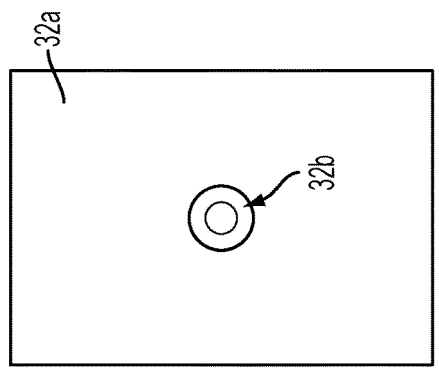
FIG. 5B is a plan view of the rod-facing surface of the movable platen.

In the embodiment of machine shown in FIG. 2, juicing machine 10 is seen to include a framework having a stand 24 for positioning machine 10 on a horizontal surface such as a counter-top or table (not shown). A frame which may be in the form of a vertically oriented mounting plate 26 extends from stand 24 to which is mounted at least one linear actuator which may be of any desired type. In this embodiment, the linear actuator is in the form of pneumatic cylinder 28 with respective rod 28a, for example. A suitable air source (not shown) causes the rod 28a to alternately extend from and retract back into cylinder 28. Rod 28a includes free end 28b which passes through a hole 26a formed in plate 26 as seen best in FIG. 5A. A movable platen 32 is removably mounted to the rod free end 28b such that rod 28, when extended, pushes the platen 32 into the pressing chamber 22. In a preferred embodiment seen in FIG. 5B, platen 32 includes cavity 32b formed in wall surface 32a which aligns with and may be removably mounted to rod free end 28b without the use of tools.

In the preferred embodiment shown, rod free end 28b is shaped as a truncated cone which fits within a complimentary shaped cavity 32b in platen wall surface 32a. As seen best in FIG. 5C, there is a slight spacing between the cavity 32b and rod free end 28b and/or the terminal end of the rod does not abut the bottom of the cavity. As such, there is no locking engagement between the two so that, once extended, the rod may be retracted without pulling the platen along with it. This allows the user to then either manually push the platen back to the retracted position or remove it with the pressing chamber when dumping the filters so that the pressing chamber and platen may be rinsed prior to being put back into machine 10. Furthermore, the platen will be restricted from tilting forward or rearward about a horizontal (transverse) axis as it is pushed by the rod.

Figure 6:
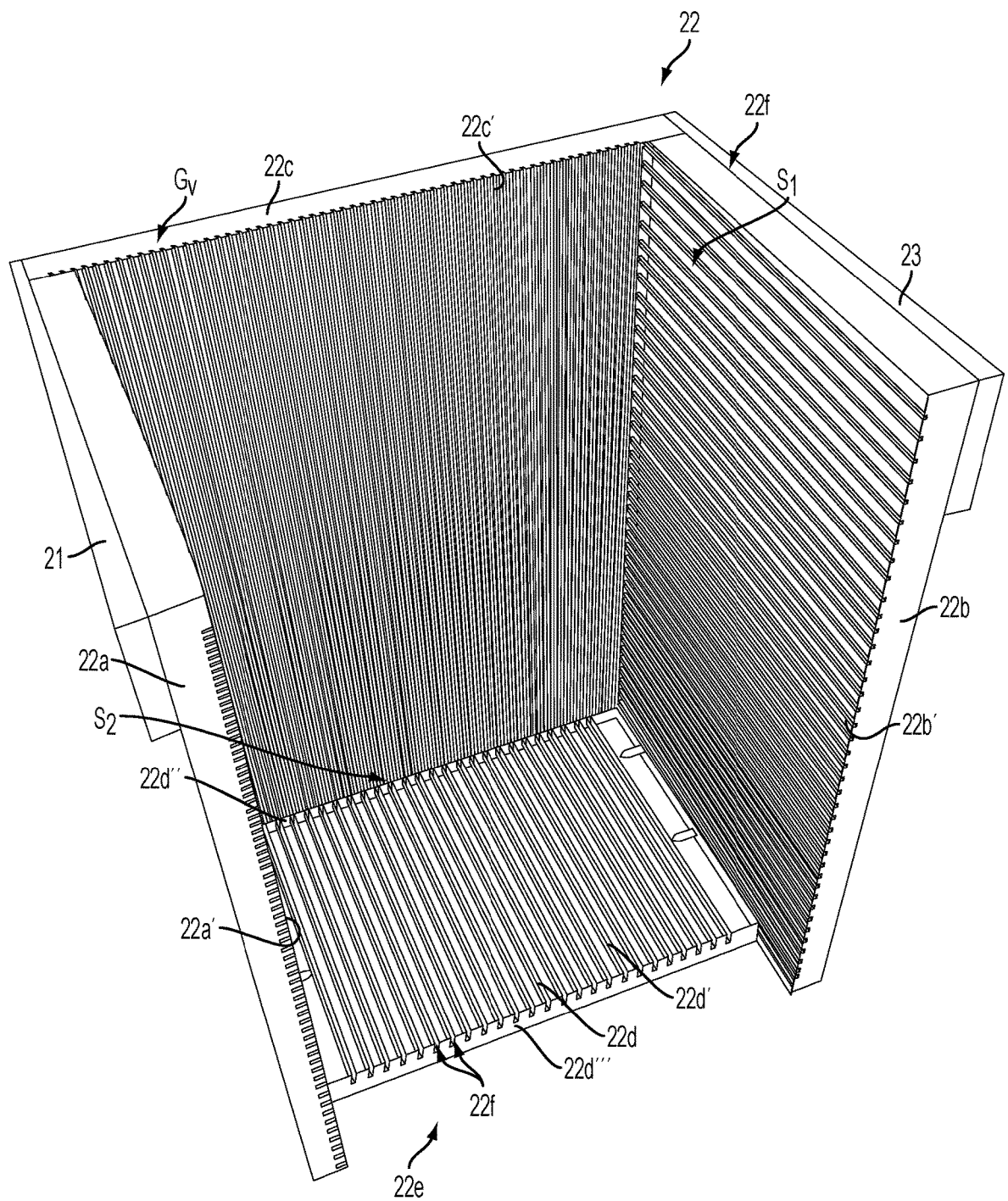
FIG. 6 is a perspective view of one preferred embodiment of the pressing chamber.

A removable pressing chamber 22 seen best in FIG. 6 includes first and second side walls 22a and 22b each having an inside surface 22a' and 22b', respectively, which face each other and extend in spaced, parallel relationship to each other. A back wall 22c having an inside surface 22c' is attached to and extends perpendicularly between first and second side walls 22a, 22b. A bottom wall 22d having an inside surface 22d' is attached to and extends between first and second side walls 22a, 22b with the first side wall 22a, second side wall 22b, back wall 22c and bottom wall 22d all together defining an interior space $S_1$ with an opening 22e positioned opposite back wall 22c and an open top 22f opposite bottom wall 22d.

As will be explained in more detail below, foodstuff to be juiced may be placed inside the interior $S_1$ of pressing chamber 22 and pressed to extract juice therefrom upon platen 32 moving in a direction beginning from chamber open side 22e and moving toward third side wall 22c between first and second side walls 22a and 22b until the foodstuff is squeezed between platen 32 and back wall 22c and juice is extracted from the foodstuff. In this regard, in one possible embodiment, bottom wall 22d may be spaced from back wall 22c to define an uninterrupted, linear open space $S_2$ therebetween (FIG. 6) and wherethrough extracted juice may pass to the outside of pressing chamber 22. Bottom wall 22d may further include ridges defining grooves 22f therebetween which have a tapering depth resulting in a slanted position with the grooves adjacent edge 22d" thereof which defines open space $S_2$ being deeper than at the opposite edge 22d''' thereof such that extracted juice falling onto bottom wall 22d is directed by gravity to open space $S_2$. Any suitable juice collector may be positioned beneath pressing chamber 22 to catch the juice falling by gravity through space $S_2$ such as juice collector 16 seen in FIG. 1, for example.

The pressing chamber back wall inside surface 22c' may include vertically extending ridges defining grooves "Gv" therebetween for directing extracted juice toward bottom wall 22d and space $S_2$. The surface 32' of platen 32 faces back wall 22c and may also include vertically extending grooves Gv configured to direct extracted juice toward bottom wall 22d and open space $S_2$. As will be explained below, the foodstuff to be juiced is positioned in pressing chamber 22 and pressed between the chamber back wall 22c and platen surface 32'. As an alternative to the embodiment described above where bottom wall 22d is spaced from back wall 22c to define a linear, uninterrupted space $S_2$ therebetween where extracted juice may fall, the bottom wall 22d may instead abut back wall 22c with the grooves Gv in one or both walls defining a plurality of linearly spaced openings wherethrough the extracted juice may fall. If desired, the grooves in each wall may be aligned which would provide a larger opening at each pair of aligned grooves.

Pressing chamber 22 may be alternately placed into and removed from the pressing machine to allow dumping of the extracted foodstuff therefrom and then replaced back into the juice pressing machine for a new juice pressing operation. In this regard, a suitable support structure is provided which may comprise shoulders 21 and 23 mounted or molded into opposite side walls 22a and 22b, respectively, where shoulders 21 and 23 may rest upon the top edges of opposite side walls 25 and 27, respectively, of the pressing chamber well 29 which may be secured to plate 26.

To press juice from a foodstuff, the foodstuff is preferably first macerated and deposited into pressing chamber 22. A pressing filter 44 which allows juice to pass through to the outside of the filter may be used to contain the foodstuff. In prior art pressing machines, the pressing filters are made thick and strong (e.g., using heavy cotton fabric) so that they do not burst as they are pressed. This can occur in areas of the filter which are unsupported which is usually at the sides of the filters. Filter rupture can also be caused by friction should the filter be moved across a surface as it is being pressed. If the filter is structurally not strong enough and/or becomes weakened due to wetness, the pressing pressure at the unsupported filter sites and/or friction can cause the filter to rupture.

Figure 3A:
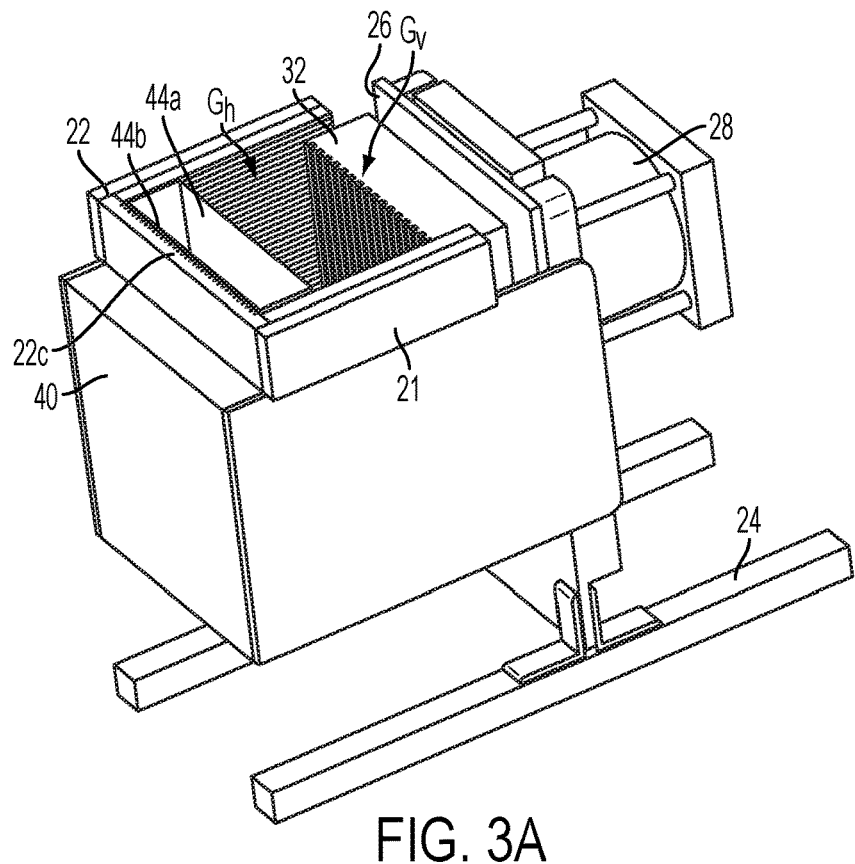
FIGS. 3A and 3B are perspective views of the machine of FIG. 2 shown without the outer housing with the movable platen in the retracted and extended positions, respectively.
Figure 3B:
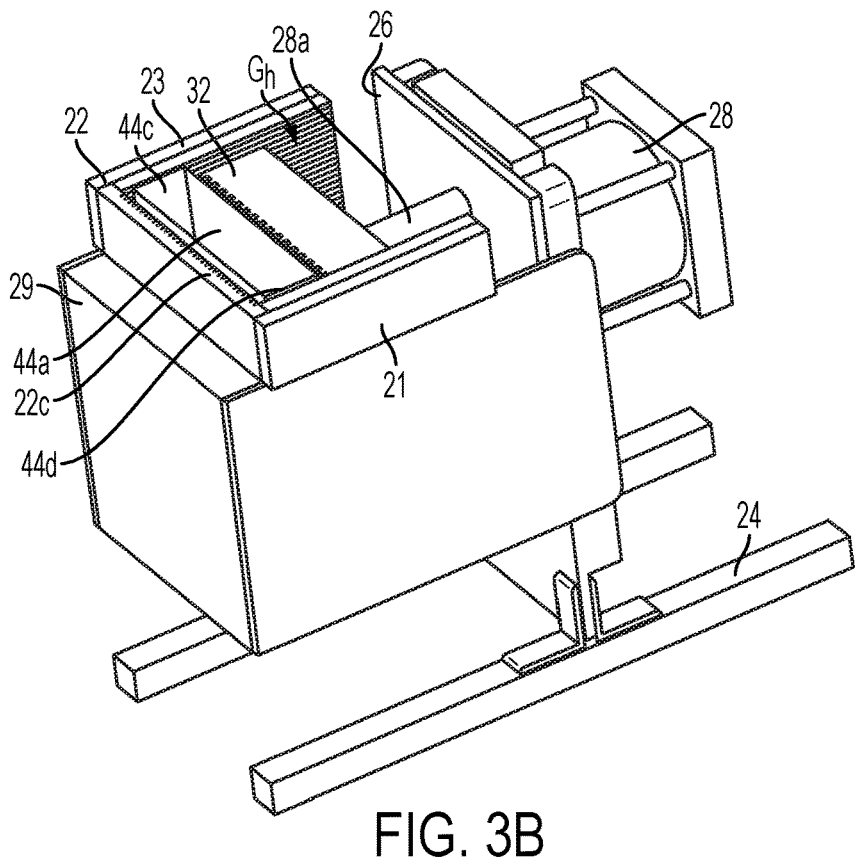
Figure 4:
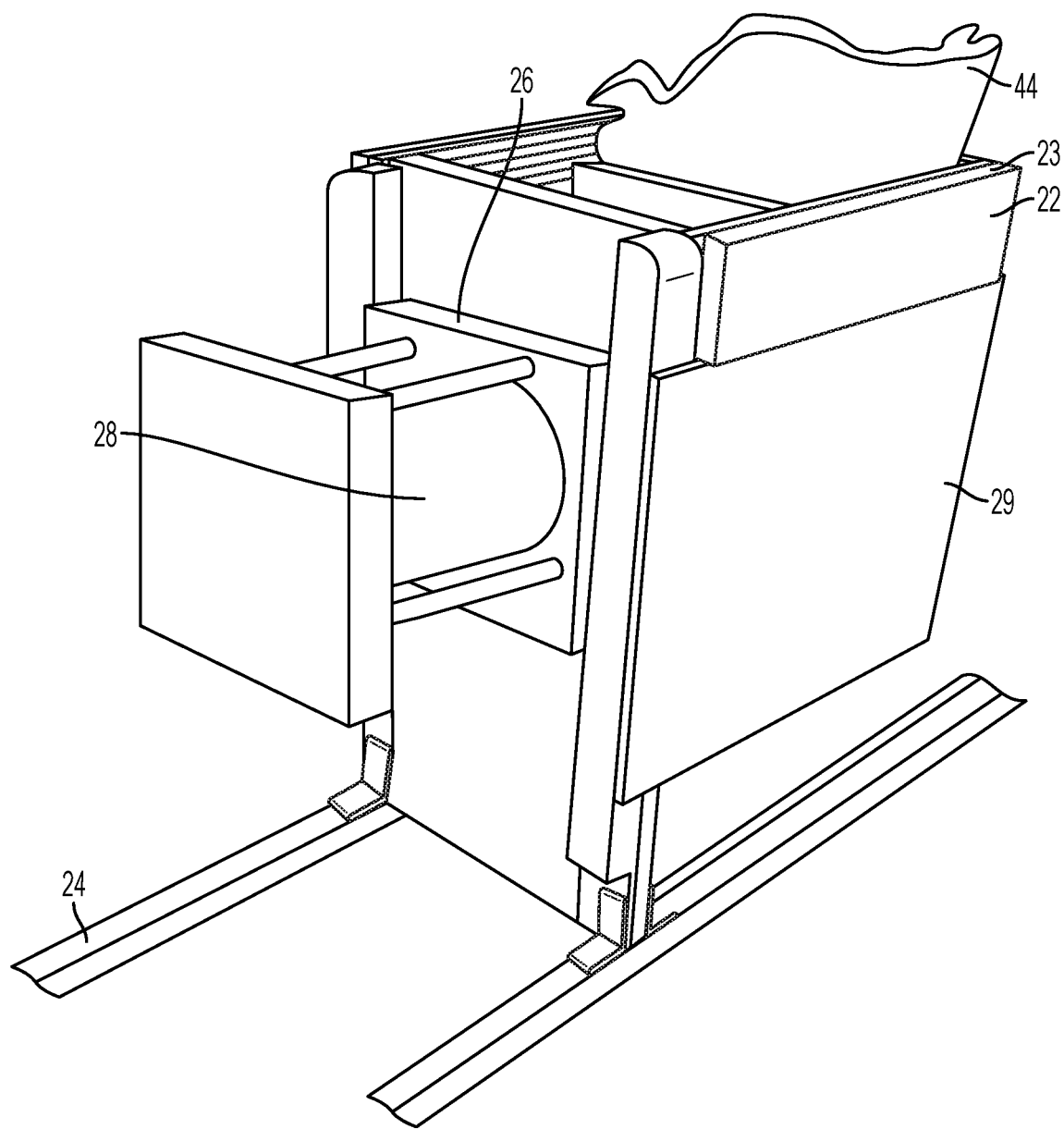
FIG. 4 is a perspective view from the rear of the pressing machine showing the platen in the extended condition against a pressing filter held in the pressing chamber.

To begin a pressing operation using a single filter, platen 32 is in the retracted position, the filter 44 is placed in pressing chamber 22 which is placed in chamber support 29 (FIG. 2). The filter 44 may then be filled with macerated foodstuff and placed in pressing chamber 22 as seen in FIG. 3A where filter 44 is in its fully expanded condition and positioned adjacent back wall 22c. The machine is activated which causes platen 32 to move toward filter 44 whereupon it engages and pushes against filter wall 44a. As the platen continues to push against filter 44, filter 44 moves until the opposite filter wall 44b thereof firmly abuts back wall 22c as seen in FIG. 2B. Since filter 44 moves as it is compressed by the platen, the side walls 44c and 44d thereof may slide along pressing chamber side wall interior surfaces 22a' and 22b', respectively.

In a preferred embodiment of the present invention, the pressing chamber side wall interior surfaces 22a' and 22b' include generally horizontally extending grooves "Gh". The grooves Gh, which extend generally in the same direction of filter movement, minimize the friction of the filter 44 with side wall interior surfaces 22a' and 22b' as the platen 32 moves against and pushes filter 44 toward back wall 22c. Since the friction is minimized and the filter side walls are at the same time supported by the chamber side walls, the chance of filter rupture is reduced.

In the preferred embodiment, the filter material may be made of inexpensive, lightweight, liquid permeable material such as the paper from which disposable coffee filters are made, for example, whereby the filter 44 may be made disposable due to this low cost. Once a juicing operation had finished, the user may thus simply dispose of the filter 44 and the now de-juiced foodstuff (termed "cake" in the art) in one quick dumping operation.

Figure 7A:
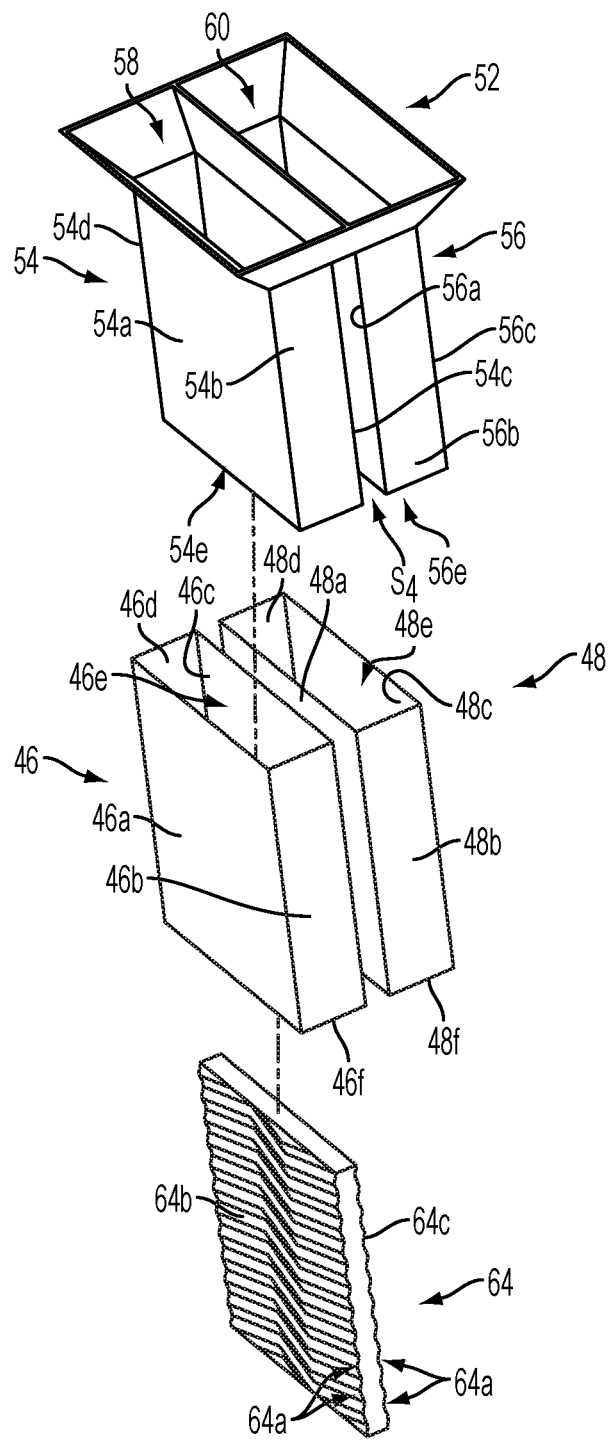
FIG. 7A is a perspective view showing the embodiment of a two neck funnel for filling two filters with a pressing plate therebetween, all in spaced relation to one another.
Figure 7B:
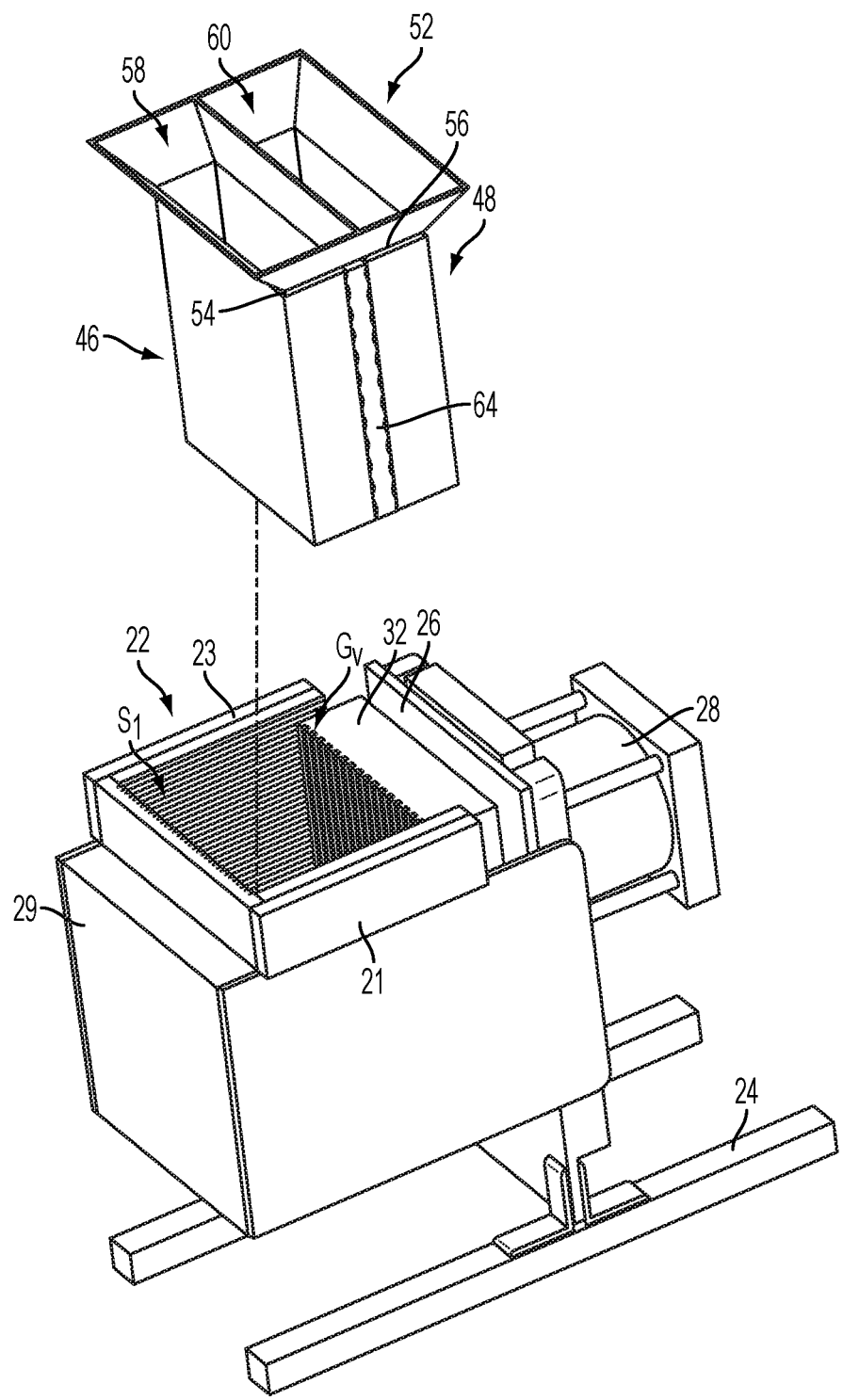
FIG. 7B is the view of FIG. 3A (absent the single filter in the chamber) showing the double-neck funnel and two filters and pressing plate being lowered into the pressing chamber of FIG. 6.
Figure 7C:
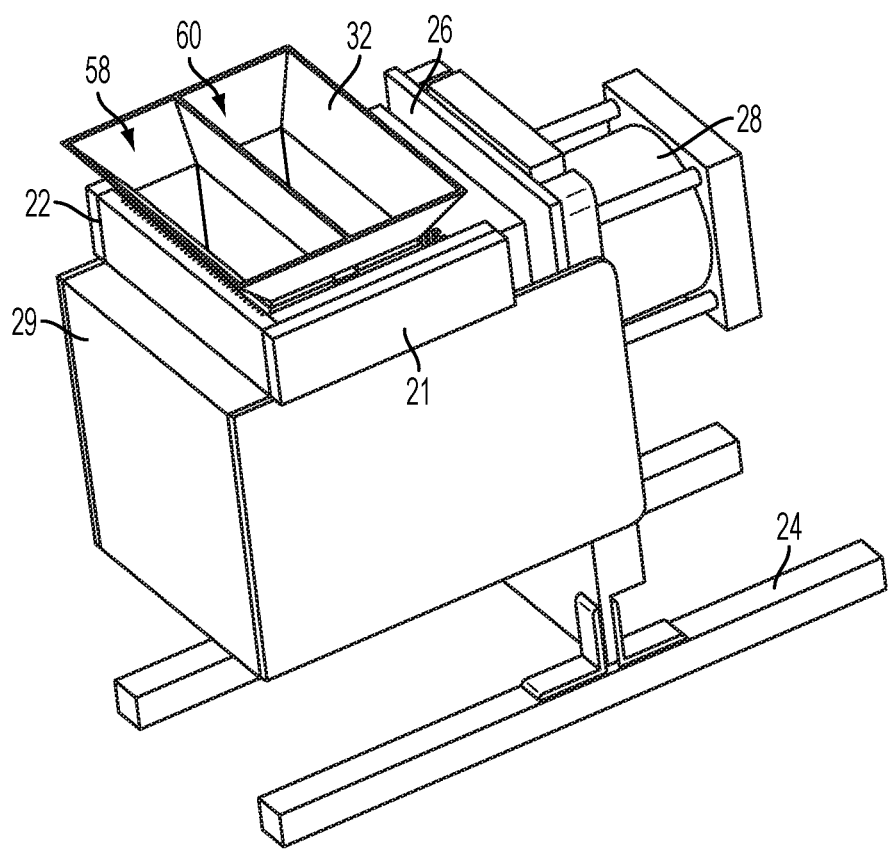
FIG. 7C is the view of FIG. 7B showing the funnel and filters and pressing plate positioned with the pressing chamber prior to filling of the filters with macerated foodstuff.

FIGS. 7A-7C illustrate another embodiment where first and second filters 46 and 48 are placed in pressing chamber 22 in side-by-side relationship for a single pressing operation to increase the amount of juice produced. A funnel 52 may be used to fill one or more filters with macerated foodstuff. In the embodiment shown, funnel 52 includes first and second hollow necks 54, 56 (only one neck would be required for filling single filters such as filter 44) extending in spaced, parallel relation from a respective hopper 58 and 60. First and second filters 46 and 48 may be passed over first and second necks 54, 56, respectively, with each filter in an expanded condition as seen in FIG. 7B. When the filters are fully mounted onto their respective funnel necks, the filter side walls 46a-d and 48a-d are all covered by the preferably closely fitted respective side walls 52a-d and 54a-d of the funnel neck to which they are mounted. The only exposed areas are the filter open tops 46e and 48e, and the filter bottom walls 46f and 48f which locate at the open end 54e and 56e of the respective funnel neck.

With the funnel and mounted filters positioned in the pressing chamber in the manner shown in FIG. 7C, macerated foodstuff may be deposited into hoppers 58 and 60 to fill the first and second necks 54 and 56. Since the side walls of the funnel necks cover the respective side walls of the filters which are mounted to the necks, the side walls of the funnel necks maintain the side walls of the respective filter untouched by the foodstuff and dry. Since the funnel necks are open at ends 54e and 56e, the macerated food stuff falls therethrough and onto the filter bottom walls 46f and 48f (FIG. 7A) which themselves are supported by pressing chamber bottom wall 22d. The filter bottom walls 46f and 48f are thus the only parts of the filters that are touched by the macerated food stuff when the filters are fully mounted onto their respective funnel necks as shown in FIG. 7B.

Figure 7D:
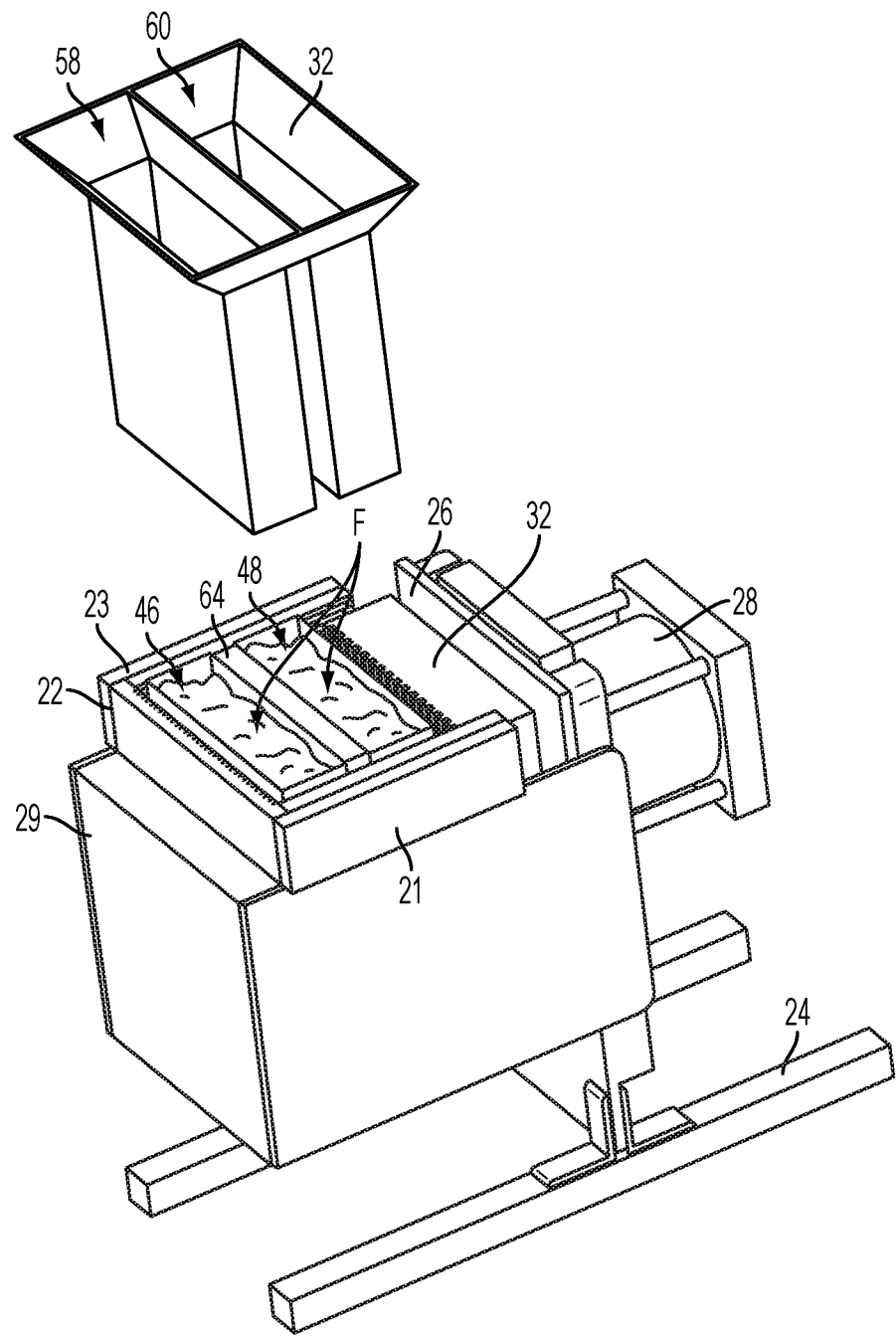
FIG. 7D is the view of FIG. 7C with the funnel shown removed from the filters leaving the filled filters and pressing plate in the pressing chamber and the platen in the retracted position.

As seen in FIGS. 7A and 7B, when more than one filter is used, a pressing plate 64 may be provided and placed in the space $S_4$ between necks 54 and 56 and facing filter side walls 46c and 48a. The user may then lift funnel 52 out of the pressing chamber 22 while leaving the filters which have been filled with macerated foodstuff "F" and pressing plate therebetween within the pressing chamber 22 (see FIG. 7D). Pressing plate 64 may include grooves 64a on each opposing side wall 64b and 64c thereof, the grooves arranged so as to direct juice toward the bottom of pressing chamber 22. The use of a pressing plate between two filled filters allow for the juice from the facing sides of the filters to be freely extracted and run down to the bottom of the pressing chamber and also reduces the amount of pressure needed by platen 32 to extract juice from each filter which in turn reduces the chance of filter rupture under force. Furthermore, the geometry of the filters allow the formation of thin layers of macerated foodstuff therein which is desirable in that thin layers allow for more efficient juice extraction than is possible with thick layers. While two filters have been shown and described, it is of course understood that more than two filters (and thus layers of macerated foodstuff) may be used during a pressing operation to increase the juice yield. A pressing plate such as plate 64 may be placed between each adjacent pair of filters.

Similar benefits are realized through the use of the innovative funnel where the funnel neck keeps the respective, fully open filter side walls dry and allows filling of the funnel neck and subsequent removal of the funnel from the filter within the pressing chamber without appreciable movement of the foodstuff in the filter to be pressed. And, as stated above, the use of a thinner filter material also reduces material cost to allow the filter to be disposable which is desirable from a cost and efficiency of use perspective.

Figure 5D:
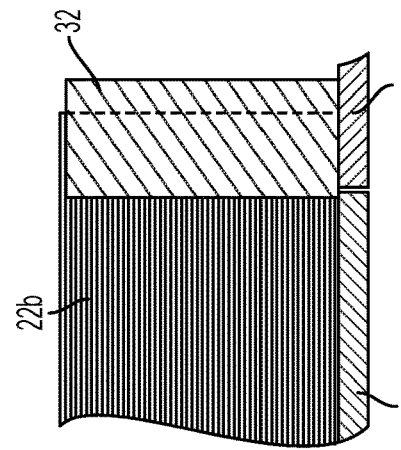
FIG. 5D is a fragmentary, side elevational view with some parts in cross-section, showing the platen in an at least retracted position with respect to the pressing chamber bottom and side wall and platen support platform.
Figure 5A:
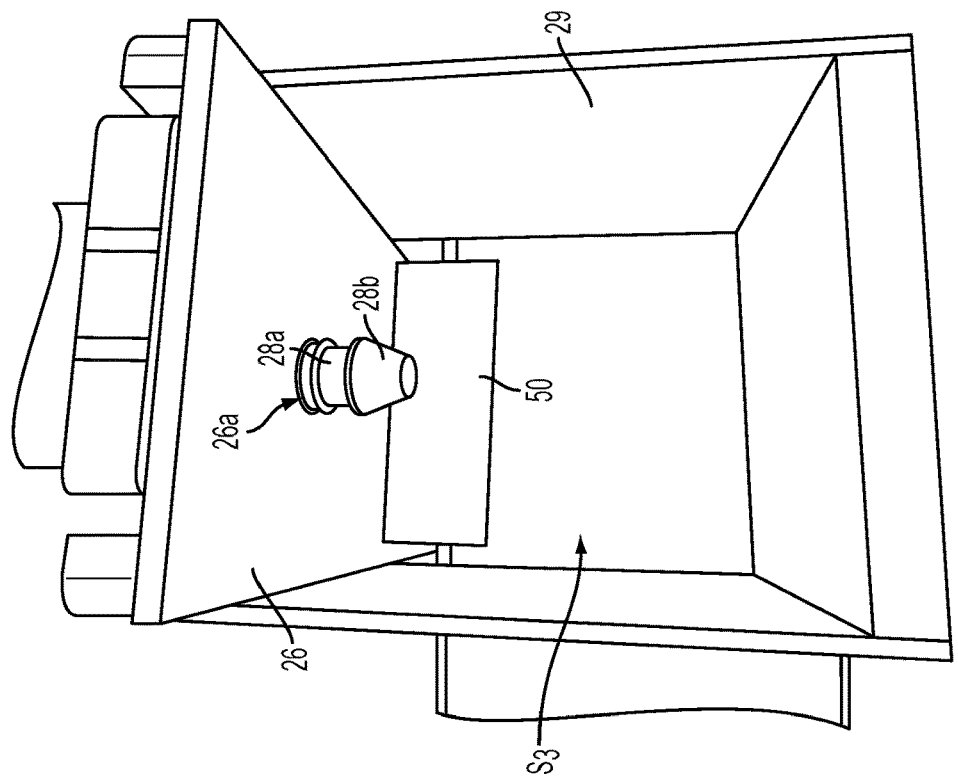
FIG. 5A is a top plan view of the pressing machine of FIG. 2 showing the area where the pressing chamber is removably positioned (the pressing chamber and platen are not shown)
Figure 7E:
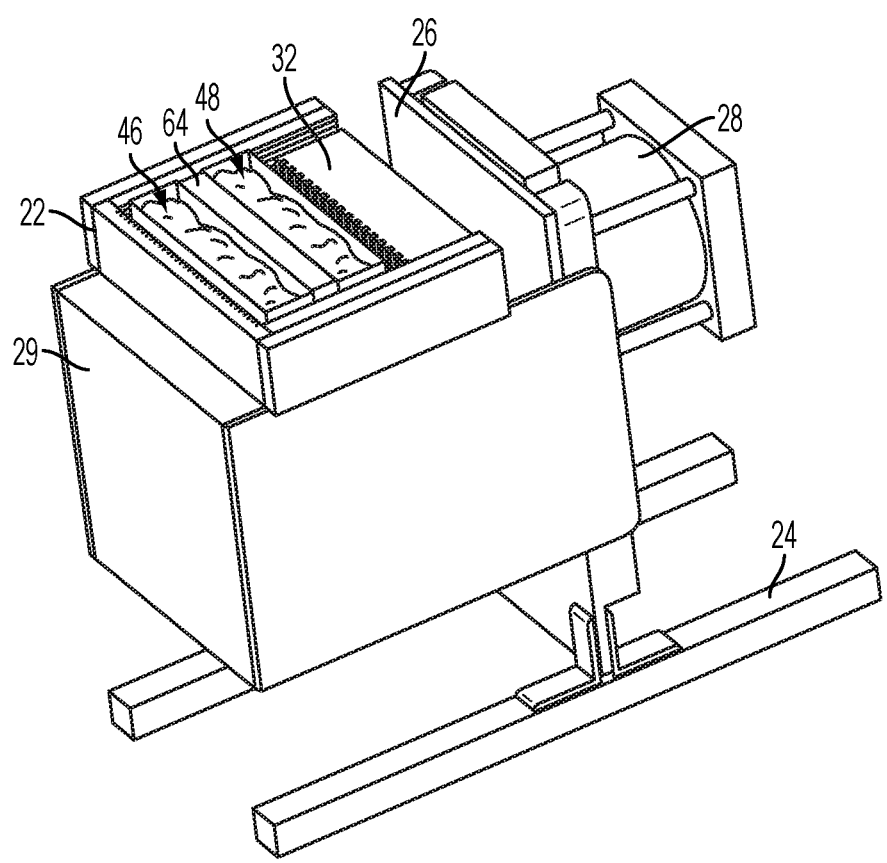
FIG. 7E is the view of FIG. 7D showing the platen in an at least partially extended position during a pressing operation.

As seen in FIGS. 5A and 5D, a platform 50 is provided which extends from plate 26 upon which platen 32 may be supported when in the retracted position shown in FIGS. 2, 3A, and 7B-7D. Support 50 lies substantially flush with pressing chamber bottom wall 22d such that platen 32 may straddle and be supported by both when in the retracted position. Furthermore, platen 32 extends between pressing chamber side walls 22a and 22b (which themselves extend beyond pressing chamber bottom wall 22d) when in the retracted position. The pressing chamber side walls thus act as guide posts to and locate the platen when in the retracted position and then smoothly guide platen 32 into the pressing chamber as rod 28a is moved to the extended position during a juicing operation. FIG. 7E illustrates the position of platen 32 after a full extension of rod 28a wherein platen 32 is pressed against filled filters 46 and 48 which themselves are pressed between platen 32 and pressing chamber back wall 22c. At all times the filters are fully supported at the locations they receive pressing pressure and hence resist rupture.

Figure 7F:
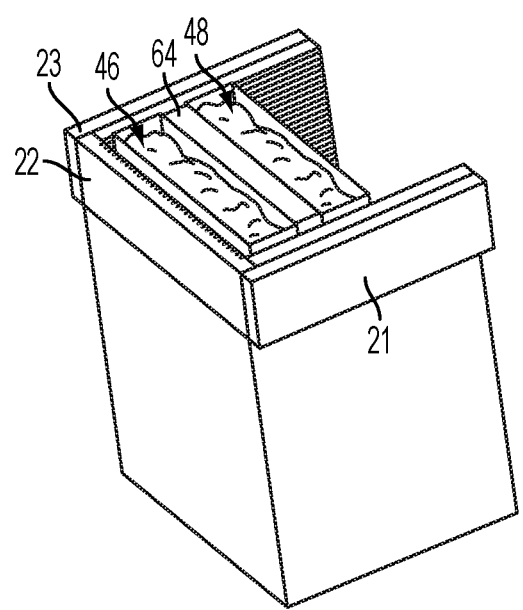
FIG. 7F is a perspective view of the pressing chamber and pressed filters with cake therein removed from the machine and ready for dumping of the filters from the pressing chamber.

Once the pressing operation is complete rod 28a is retracted. In the embodiment shown, rod 28a automatically withdraws from platen 32 which itself remains in position against the filters in the pressing chamber as seen in FIG. 7E. The user then has the choice of removing platen 32 from the chamber, pushing it back onto support 50 or keeping it in the pressing chamber. The user may then easily dispose of the pressed filters and cake by removing the pressing chamber with the filters therein as seen in FIG. 7F. The user may then dump the filters into a trash/recycle bin, rinse the pressing chamber if needed and place the pressing chamber back into the chamber support 29 in preparation for another juicing operation. Since the platen is separable from the rod, it too may be easily removed, rinsed and replaced as needed, together with or separate from the pressing chamber.

Another embodiment of the invention is seen in FIGS. 8-18 wherein the same and/or similar parts to the embodiment of FIGS. 1-7 are indicated by the same reference numerals increased by a factor of 100. The main differences between this embodiment and previous embodiments will now be described.

A removable pressing chamber 122 seen best in FIGS. 13-18 includes first and second side walls 122a and 122b each having an inside surface 122a' and 122b', respectively, which face each other and extend in spaced, parallel relationship to each other. A back wall 122c having an inside surface 122c' is attached to and extends perpendicularly between first and second side walls 122a, 122b. A bottom wall 122d having an inside surface 122d' is attached to and extends between first and second side walls 122a, 122b with the first side wall 122a, second side wall 122b, back wall 122c and bottom wall 122d all together defining an interior space $S_1$ with an opening 122e positioned opposite back wall 122c and an open top 122f opposite bottom wall 122d.

Figure 13:
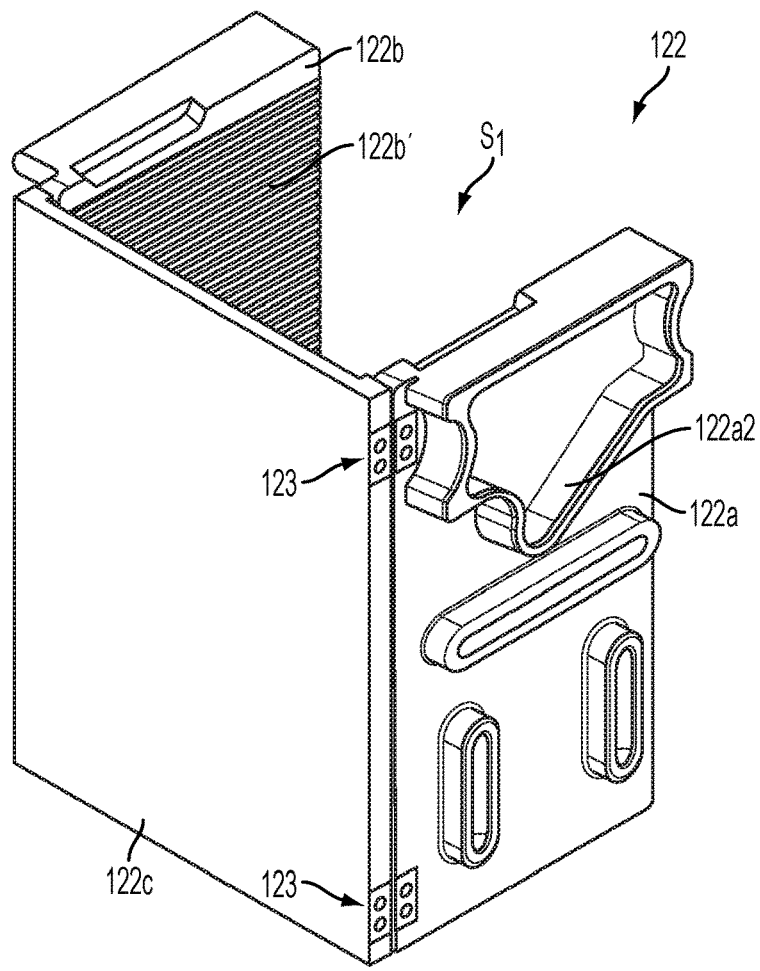
FIG. 13 is a perspective view of the pressing chamber of the embodiment of FIG. 8.
Figure 14:
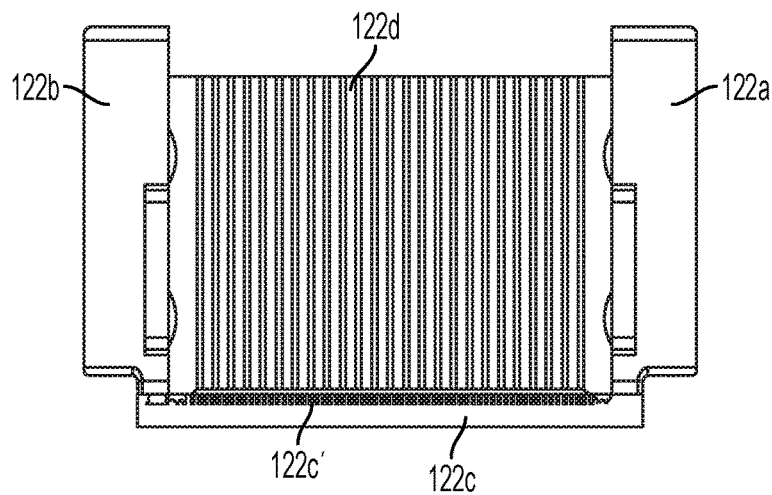
FIG. 14 is a top plan view thereof.
Figure 15:
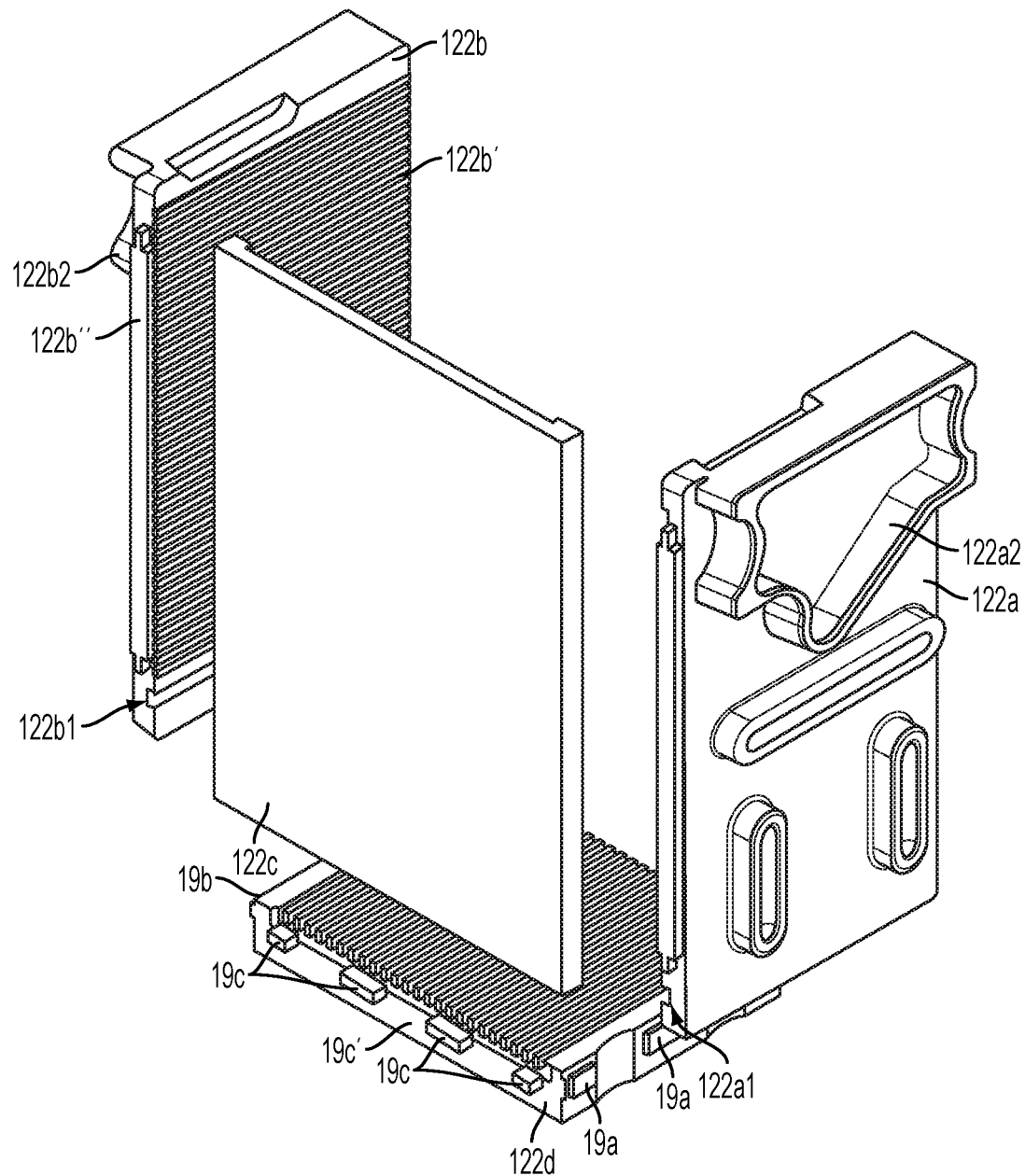
FIG. 15 is an exploded rear perspective view thereof.
Figure 16:
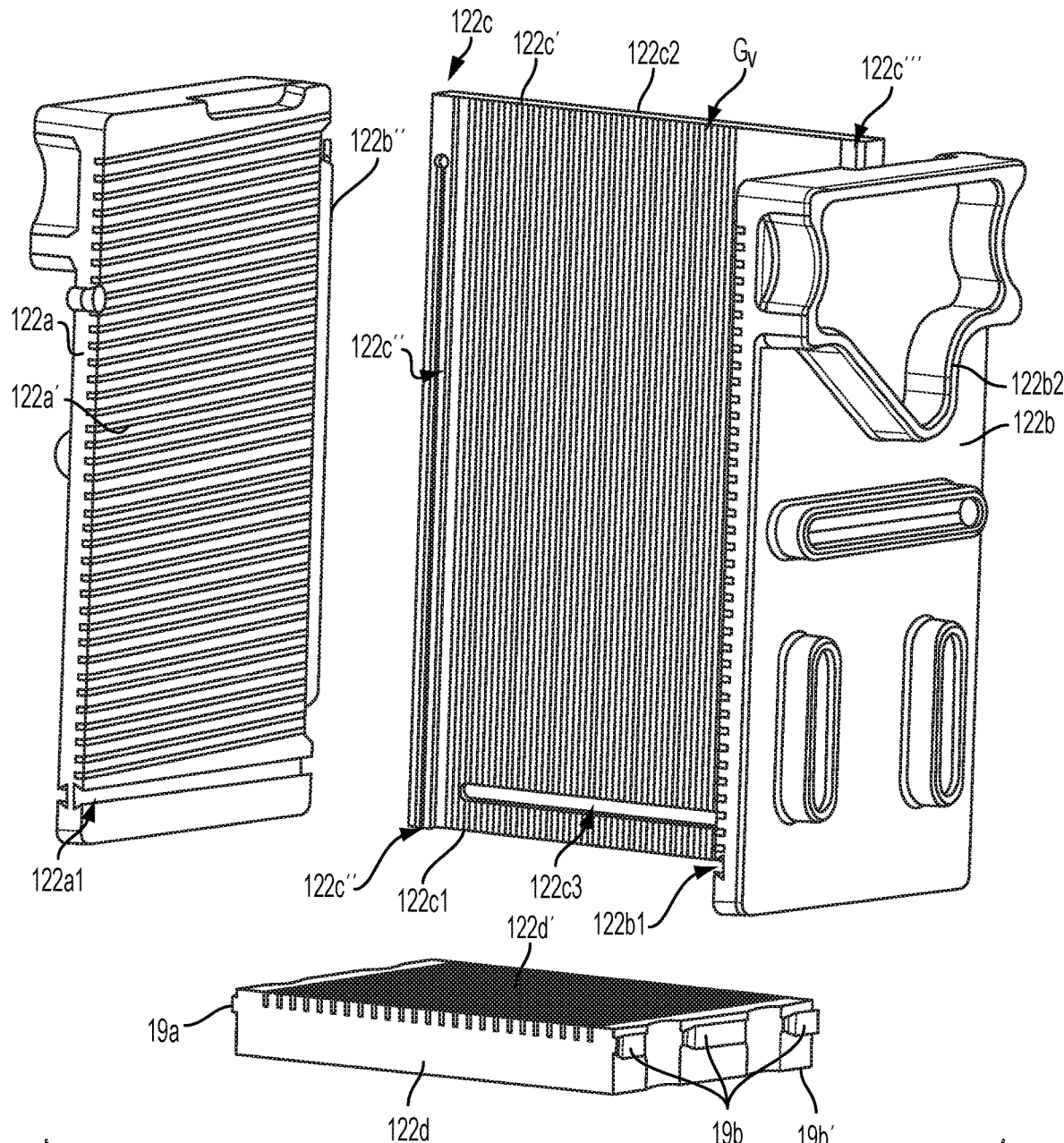
FIG. 16 is an exploded front perspective view thereof.
Figure 17:
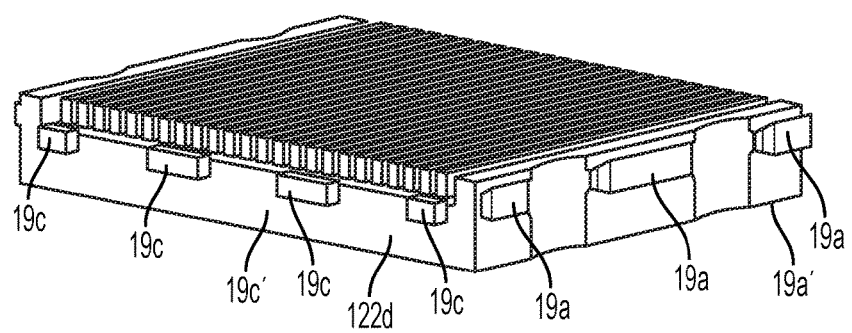
FIG. 17 is a rear perspective view of the bottom wall of the pressing chamber.
Figure 18:
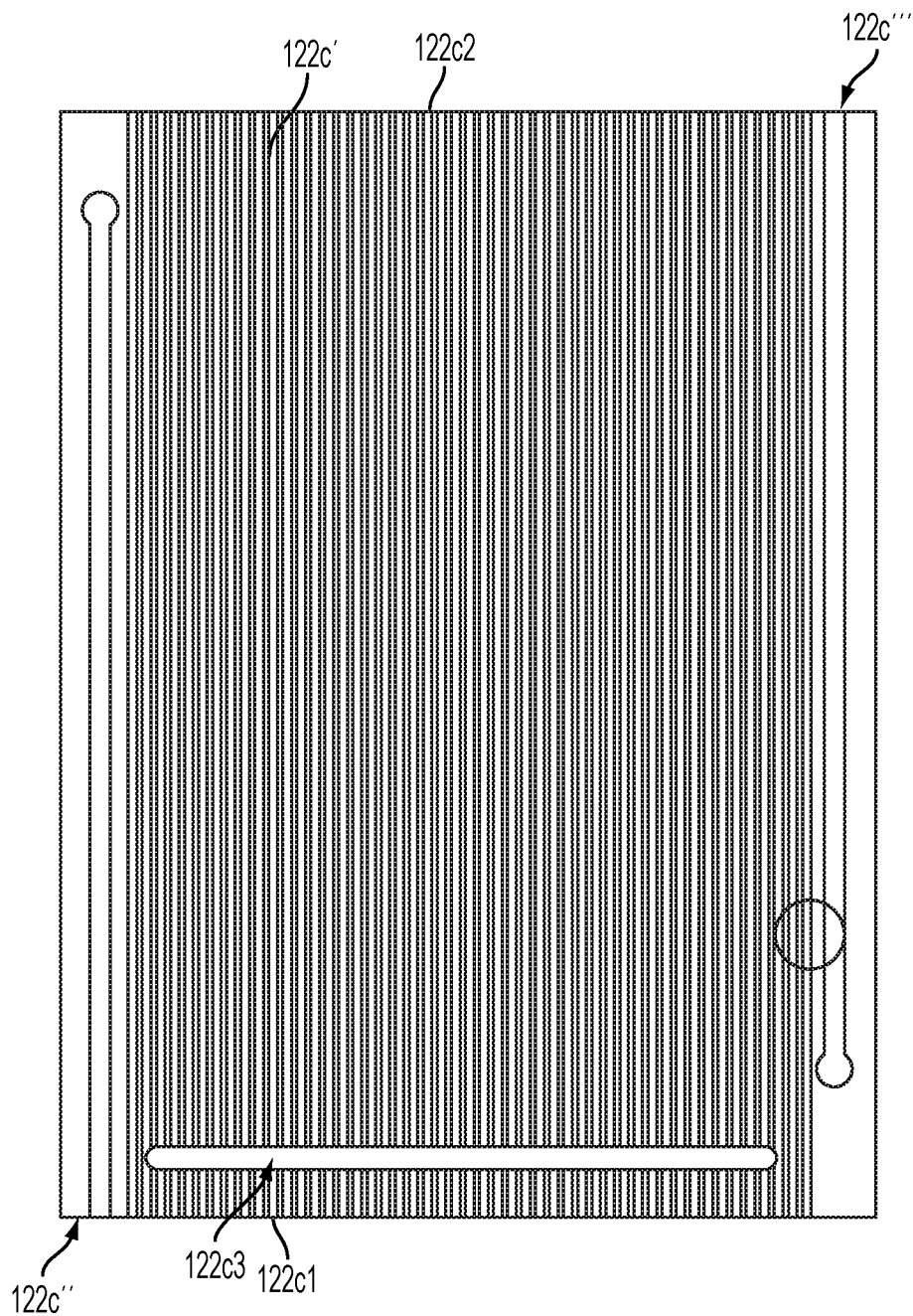
FIG. 18 is a front elevational view of the back wall of the pressing chamber.

Pressing chamber 122 is formed with walls which have edges with cooperatively configured elements that releasably interconnect with each other and thereby allow the assembled pressing chamber seen in FIGS. 13 and 14 to be disassembled into individual walls seen in FIG. 15-18 for easy cleaning and storage. For example, cooperatively configured elements may comprise flanges 122b" and 122c" extending along the side edges of side walls 122b and 122c which slide into longitudinally extending grooves 122c" and 122c''' formed along the opposite side edges of back wall 122c, respectively. As seen best in FIG. 18, the grooves may open at one end wherein groove 122c" opens adjacent back wall bottom edge 122c1 and groove 122c''' opens adjacent back wall top edge 122c2. Flanges 122b" and 122c" are inserted at groove open ends 122c" and 122c''' and slid therein until they are in full engagement as seen in FIG. 13, respectively.

Pressing chamber bottom wall 122d includes flanges 19a and 19b formed along the opposite side edges 19a' and 19b' thereof that releasably fit within grooves 122a1 and 122b1 formed in opposite side walls 122a and 122b, respectively. Pressing chamber bottom wall 122d further includes flanges 19c formed along rear edge 19c' (FIG. 17) which releasably fit within groove 122c3 formed in chamber back wall 122c. While a dovetail fit is shown it is understood that any cooperatively configured elements that releasably interlock with one another would be suitable for this embodiment of pressing chamber.

Figure 8:
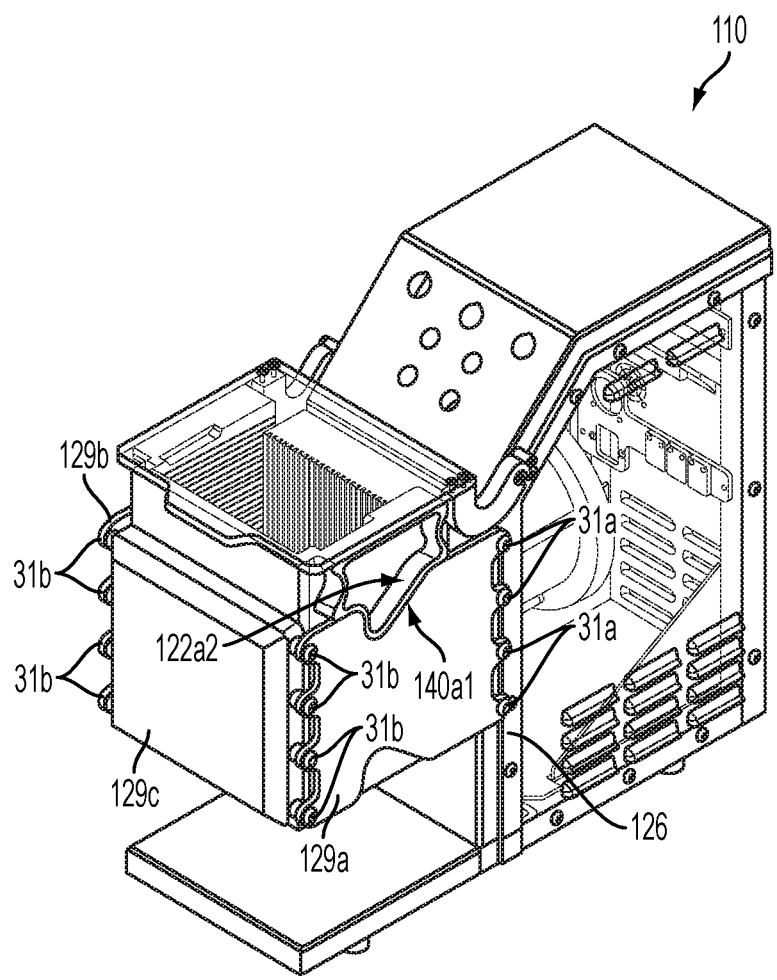
FIG. 8 is a perspective view of another embodiment of a juice pressing machine in accordance with the invention.
Figure 9:
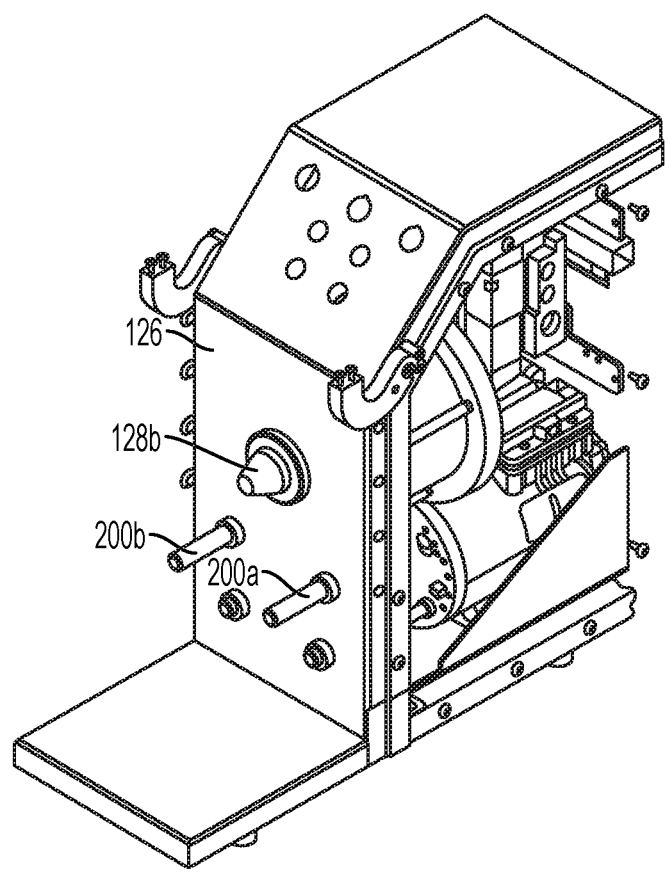
FIG. 9 is the view of FIG. 8 with the pressing chamber and chamber support elements removed.

Referring also now to FIG. 8, a pressing chamber support is provided by first and second opposite side panels 140a and 140b which may be identically formed, and a front panel 140c, respectively. The first and second opposite side panels 140a and 140b may be mounted to plate 126 of juice pressing machine 110 via screws 31a (also present but not seen on panel 140b in the view of FIG. 8). Likewise, front panel 140c may be attached to and between side panels 140a and 140b via screws 31b.

Cooperatively configured elements are formed on side panels 140a, 140b and pressing chamber side walls 122a, 122b such that, when placed together, correctly position pressing chamber 122 for a juicing operation. Such cooperatively configured elements may take the form of a downwardly curved flange 122a2 and 122b2 on side walls 122a and 122b, respectively, and cooperatively formed curved edges 140a1 and 140b1 formed along the upper edges of side panels 140a and 140b, respectively. Due to this cooperative configuration between the curved flanges and curved edges, placing pressing chamber 122 between side panels 140a and 140b causes the flanges 122a2 and 122b2 to automatically locate within and engage the curved edges 140a1 and 140b1, respectively, thereby positioning the pressing chamber in the correct location ready for a juicing operation.

Figure 10:
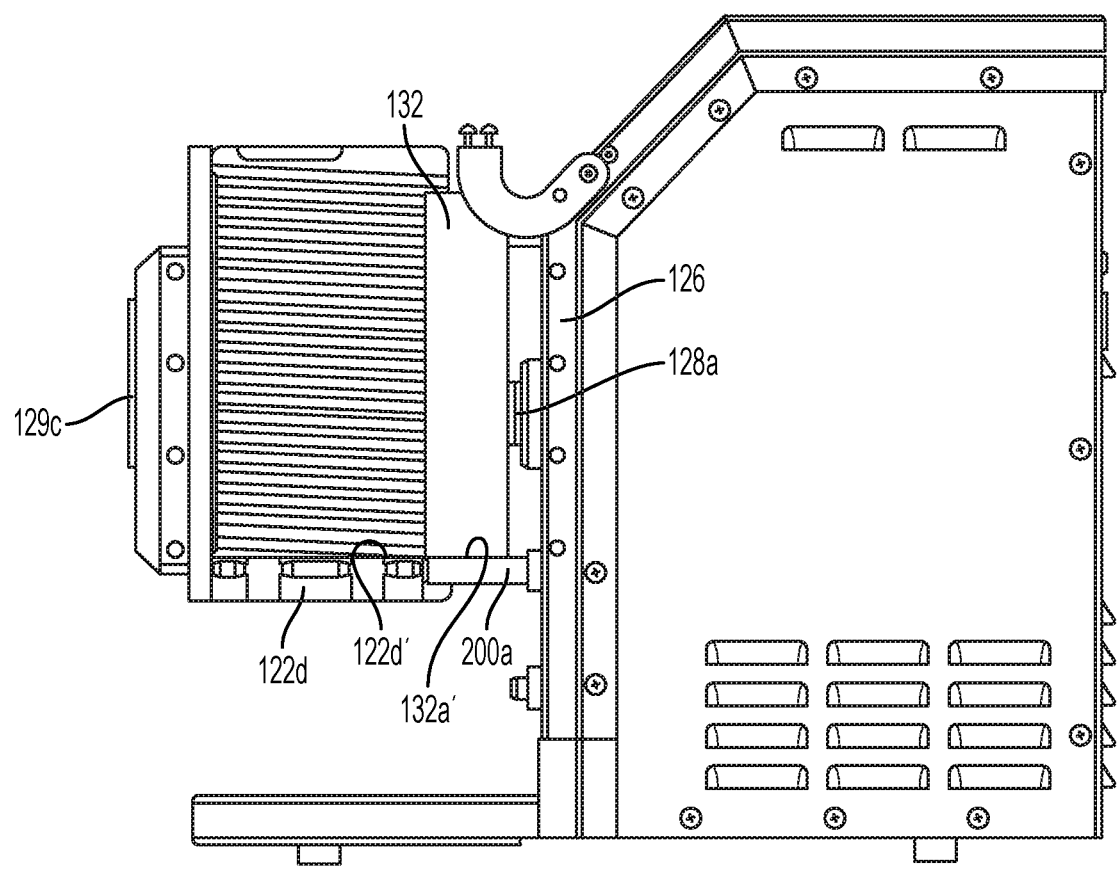
FIG. 10 is a side elevational view of FIG. 8 with the right adjacent side walls of the pressing chamber and the chamber support removed.
Figure 11:
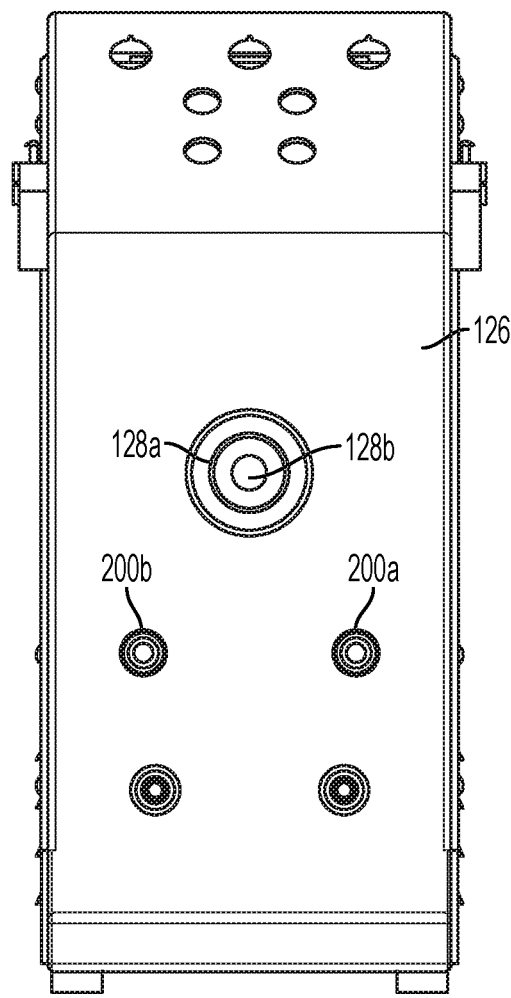
FIG. 11 is a front elevational view of FIG. 9.
Figure 12:
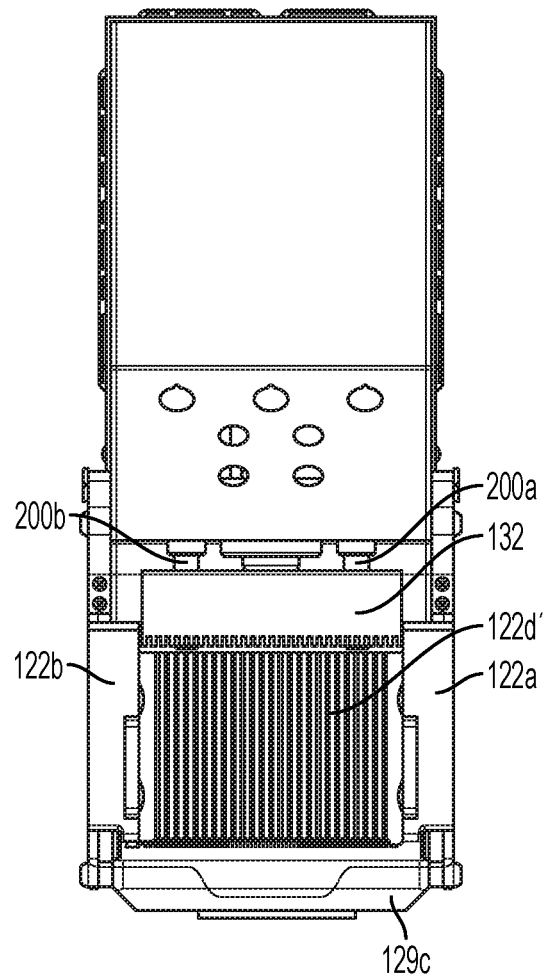
FIG. 12 is a top plan view of FIG. 8.

As seen in FIGS. 9-12, the correct pressing location of the pressing chamber aligns the pressing chamber bottom wall inside surface 122d' with the bottom edge 132a' of platen 132 (see FIG. 10). In this regard, it is noted platen bottom edge 132a' may be supported on first and second spaced rods 200a and 200b extending from frame or plate 126. Rods 200a, 200b may be used instead of a platform 50 but the alignment is the same as described and seen in FIG. 5D. As in the embodiment of FIGS. 1-7F, the start of a pressing operation causes rod free end 128b to extend wherein it pushes platen 132 into the pressing chamber 122 space S1 wherein the foodstuff is located using the foodstuff loading apparatus and process described with reference to FIGS. 7A-7F.

Figure 19:
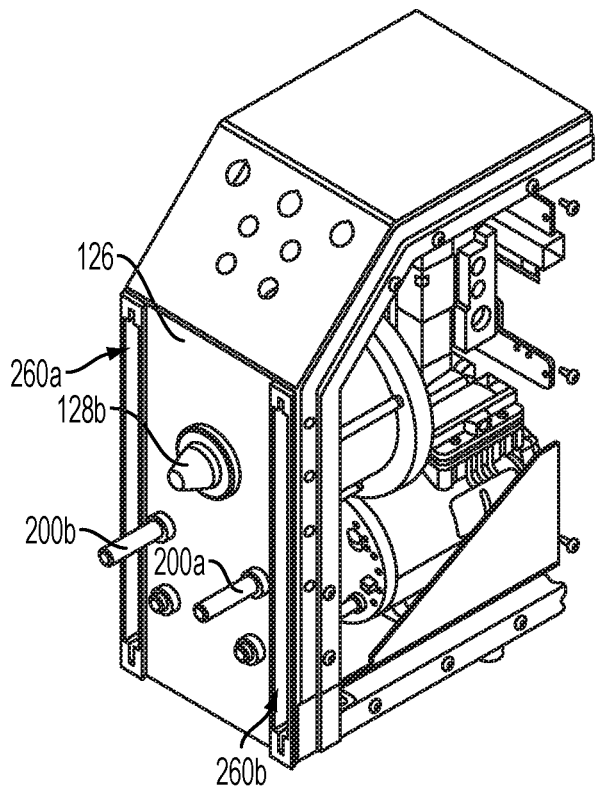
FIG. 19 is a perspective view of another embodiment of the juice pressing machine of the invention.
Figure 20:
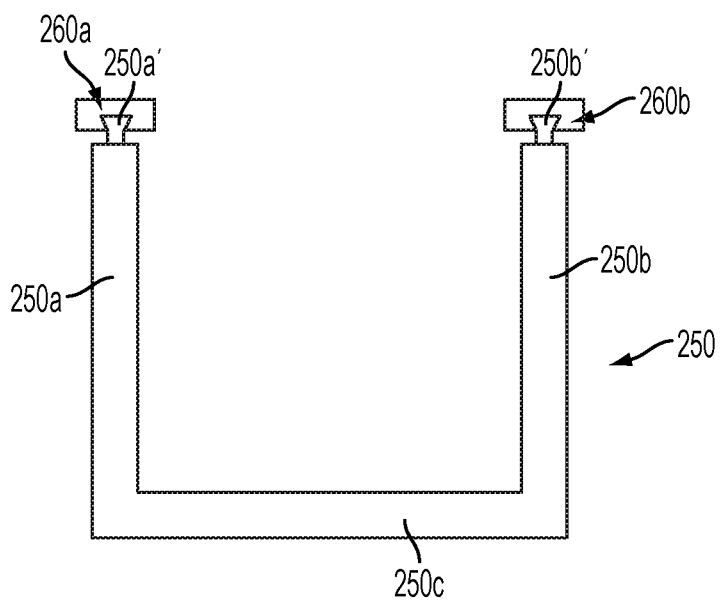
FIG. 20 is a top plan view of another embodiment of pressing chamber for use with the machine of FIG. 19.
Figure 21:
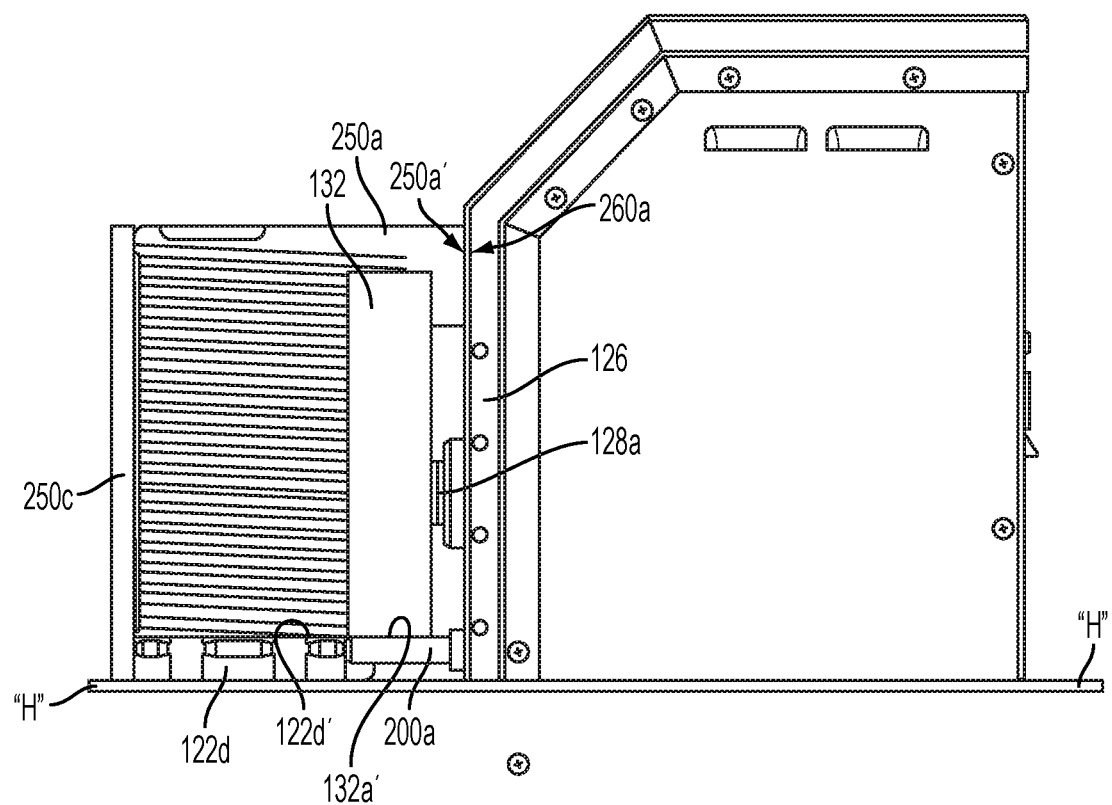
FIG. 21 is a side elevational view of FIG. 19 with the right adjacent side wall of the pressing chamber removed.

FIGS. 19-22B show two further embodiments of the invention where the pressing chamber is self-supporting and includes attachment elements for removably mounting directly to the frame of the machine. In the embodiment of FIGS. 19-21, pressing chamber 250 has a back wall 250c and opposite side walls 250a and 250b which each include an attachment element in the form of a wedge-shaped flange 250a' and 250b', respectively, which removably lock into cooperative attachment elements in the form of grooves 260a and 260b formed in the machine frame 126 (e.g., by sliding the flanges into the grooves beginning at the upper end of the grooves). The flanges thus interlock with and will not release from the grooves until the pressing chamber is lifted up and out of the grooves. The pressing chamber may thus sit on the same horizontal surface "H" as the machine housing and frame 126 or it may sit on a juice collection tray (not shown in this embodiment).

The embodiment of FIGS. 22A and 22B show another embodiment where the attachment elements comprise one or more arms 272a and 272b having hooked ends 272a' and 272b' attached to opposite pressing chamber side walls 270a and 270b, respectively. The hooked ends 272a' and 272b' may removably attach to posts 275a' mounted to opposite side walls of the machine housing (the posts on the side wall 18b of the machine opposite housing side wall 18a are not shown).

Figure 23A:
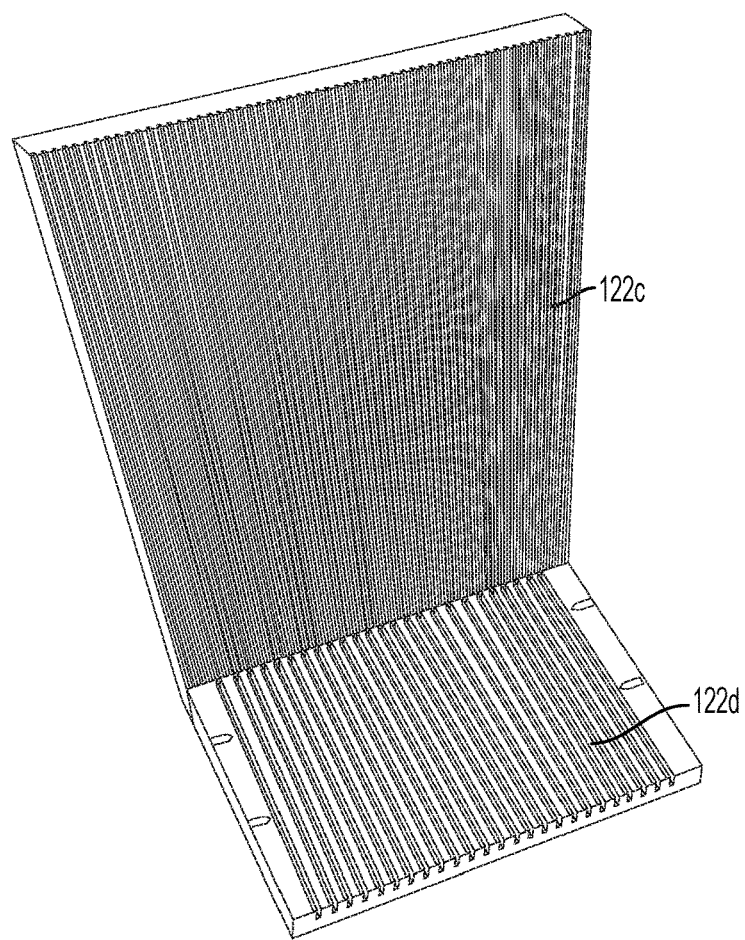
FIGS. 23A and 23B are front perspective and side elevational views, respectively, of another embodiment of pressing chamber in accordance with the invention.
Figure 23B:
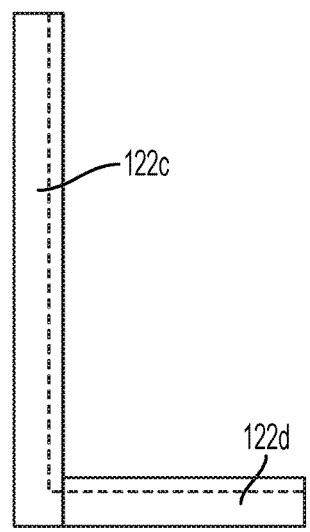

FIGS. 23A and 23B show an embodiment of pressing chamber having only a bottom wall 122d and back wall 122c (no side walls) which may be movable (e.g., via an optional hinge connection such as seen at 123 in FIG. 13) or removable with respect to each other as the pressing chamber walls shown and described with reference to FIGS. 15-18.

Figure 24:
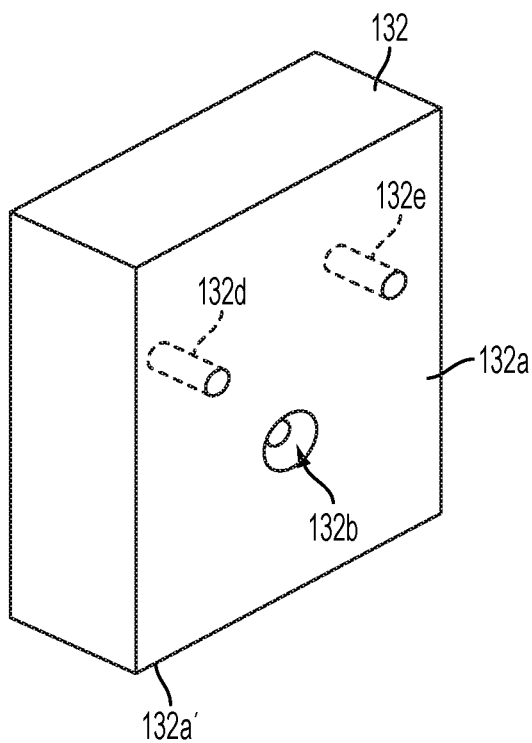
FIG. 24 is a perspective view of another embodiment of a platen in accordance with the invention.
Figure 25:
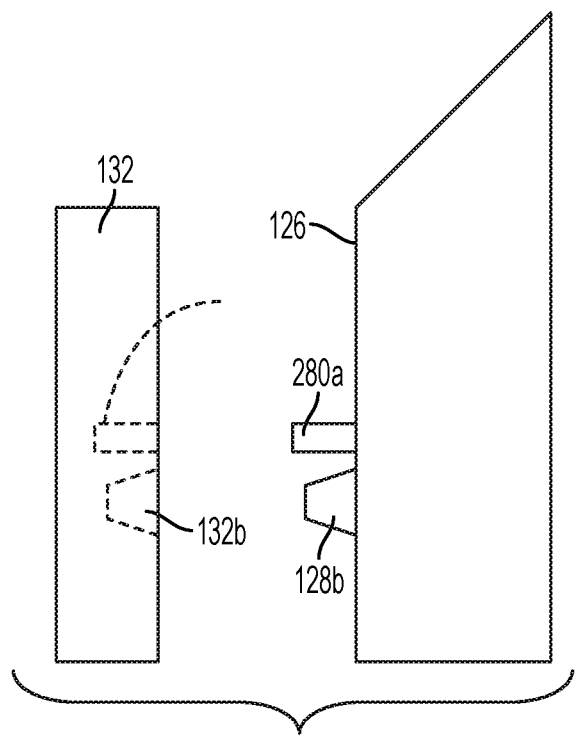
FIG. 25 is a side elevational view of the platen of FIG. 24 in spaced relation to the frame supporting the push rod and pins of another embodiment of the juice pressing machine in accordance with the invention.

FIGS. 24 and 25 show a platen 132 having a back wall 132a with a recess 132b for engagement with the rod free end 128 extending from frame 126. In this embodiment, rather than being supported at the platen bottom edge 132a', the platen is supported on two laterally spaced pins 280a and 280b (280b is not shown) which removably and freely slide back and forth within laterally spaced holes 132d and 132e formed into platen back wall 132a, respectively.

In an embodiment, the dimensions of the fluid (juice) pathways in the pressing surfaces (e.g., grooves such as Gv and Gh or holes formed in the pressing surfaces) are selected such that the tensile strength of the filter is greater than the highest tensile force imparted on it by the foodstuff over an unsupported area of the filter during pressing. This is done by limiting at least one dimension, height or width, of the unsupported areas. The pressure on the unsupported area of the filter over a fluid pathway translates to tensile force along the supported edge which can cause rupture.

By using many narrow and closely spaced fluid pathways it is possible to maintain the same total drainage area while decreasing the size of each unsupported area. The size of the unsupported areas is the influencing variable of the force imparted on the filter material, while the spacing of the fluid pathways is the influencing variable on total drainage surface area of the pressing surface.

In an embodiment, a range of about ¼" to ¹⁄₃₂" is selected as the maximum unsupported length of a filter in at least one direction (this would apply to ¼" diameter holes, or ¼" width grooves). Even distribution of the fluid pathways having at least 25%-50% drainage (of the fluid flowing along the pressing surfaces) area is ideal.

For example, if a 50% drainage area is desired, about 1" wide ridges and 1" wide grooves, or more preferably about ¼" ridges and ¼" grooves. The latter results in ¼ the force on any unsupported filter area and the same amount of drainage area.

A method for extracting juice from a macerated foodstuff may thus comprise the following steps:

a) providing a pressing surface having a plurality of fluid pathways;

b) providing a filter material on said pressing surface with the filter material being unsupported by at the location of said plurality of fluid pathways, the filter material having a predetermined tensile strength and being permeable to allow juice from the macerated foodstuff to pass through the filter material and into the fluid pathways; and c) applying a pressing force of predetermined magnitude against the macerated food stuff in a direction normal to the pressing surface, wherein the pressing force, predetermined tensile strength and area of each of the plurality of fluid pathways are selected such that the resulting tensile force on any section of the unsupported filter material is less than said predetermined tensile strength of said filter material.

Figure 26:
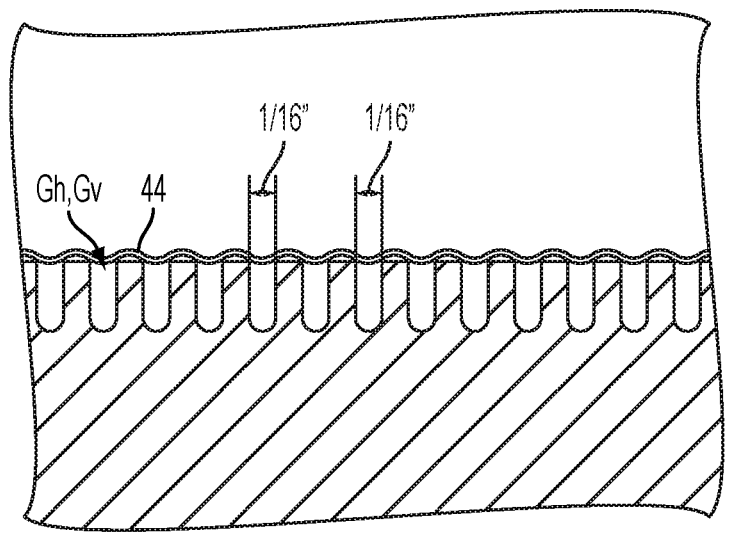
FIG. 26 is a fragmentary cross sectional view of another embodiment of pressing surface groove pattern.
Figure 27:
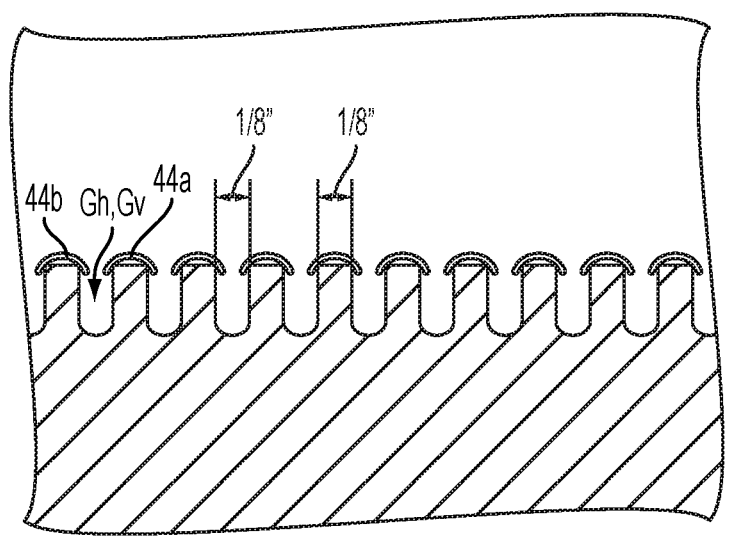
FIG. 27 is a fragmentary cross sectional view of another embodiment of pressing surface groove pattern.
Figure 28:
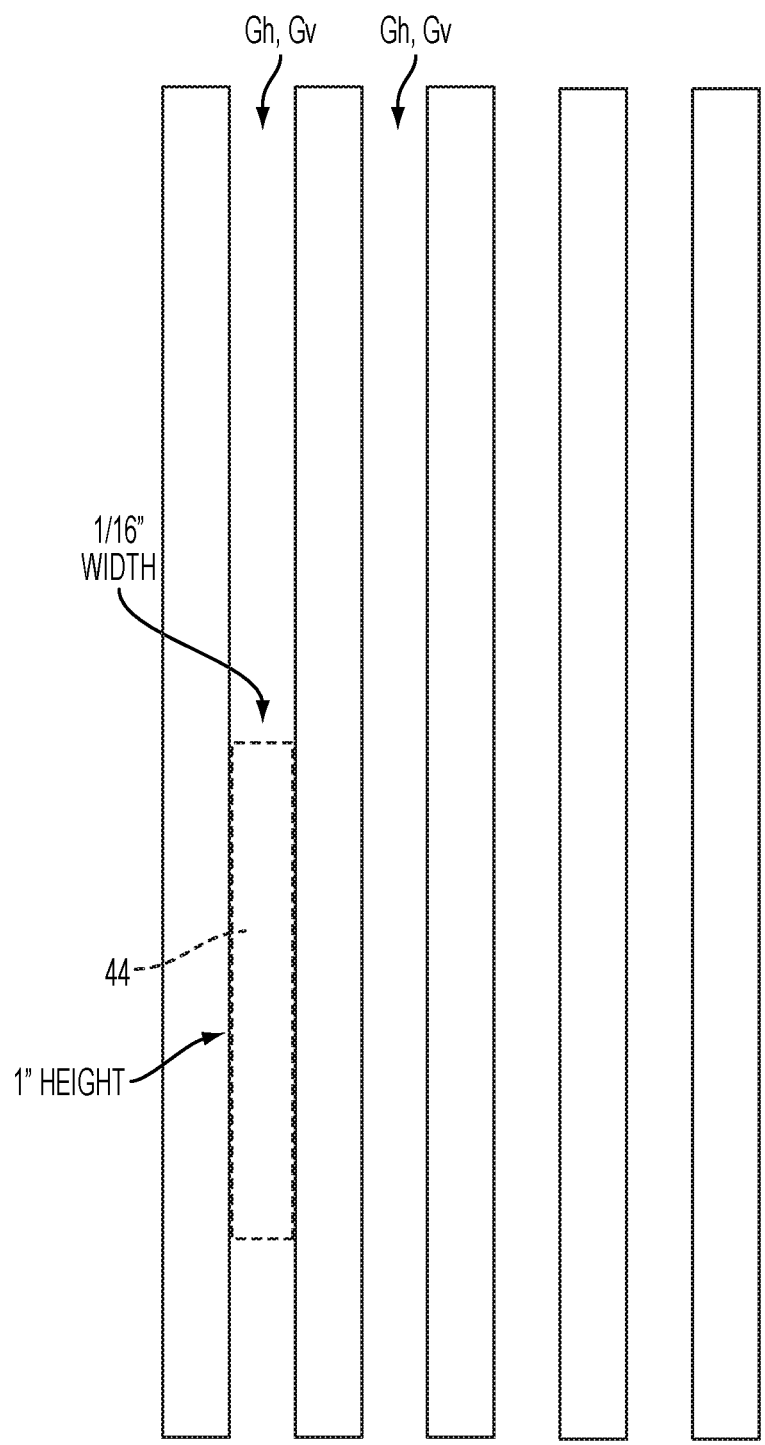
FIG. 28 is a plan view of FIG. 26 and further showing an outline of a segment of filter on the pressing surface.

The relationship of the filter strength to the groove width of the pressing surfaces may thus be calculated to reduce the risk of filter rupture. In another embodiment of the present invention, the width of the grooves on the pressing surfaces is in the range of about ¼th of an inch to about ¹⁄₃₂nd of an inch, is more preferably in the range of about ¹⁄₁₄th of an inch to about ¹⁄₁₈th of an inch, and is most preferably about $\frac{1}{16}^{th}$ of an inch. FIGS. 26 and 28 show the most preferred groove width dimension of $\frac{1}{16}^{th}$ an inch on the pressing surfaces (such as Gh and Gv, for example) with a filter material having a tensile strength of 650 N/m (3.7 lb/in.) and a pressing pressure of 50 psi wherein the force on one inch of the filter at the groove is calculated as 50 psi×$\frac{1}{16}^{th}$ in=3.125 lb/in which is just under the rated strength of the filter of 3.7 lb/in. If the groove spacing is too large, the same filter material and pressure will result in filter rupture as shown in FIG. 27 where filter 44 is broken into pieces 44a and 44b when the groove width is $\frac{1}{8}^{th}$ inch which is too large for this tensile strength of filter and pressing force.

FIGS. 29 and 30 show an embodiment where macerated food stuff "F" is loaded into a filter 280 having first and second side walls 280a and 280b, a bottom portion 280c and an open top 280d all defining an internal cavity 280e. A tray 290 is provided having a tray surface 290a. The foodstuff "F" is deposited onto tray surface 290a as seen in FIG. 29. The tray edge 290a' is inserted at least partially into filter internal cavity 280e with the tray surface covering at least part of one of the filter first and second side walls such as side wall 280b as seen in FIG. 30. The tray is then withdrawn from the filter while leaving the macerated food stuff "F" in the filter. Withdrawing the tray may be performed by tipping the tray relative to the filter which causes the macerated food stuff to slide off the tray surface and into the filter internal cavity as seen in FIG. 30. The tray may include a handle 292 and/or side walls 294a and 294b if desired.

Figure 31:
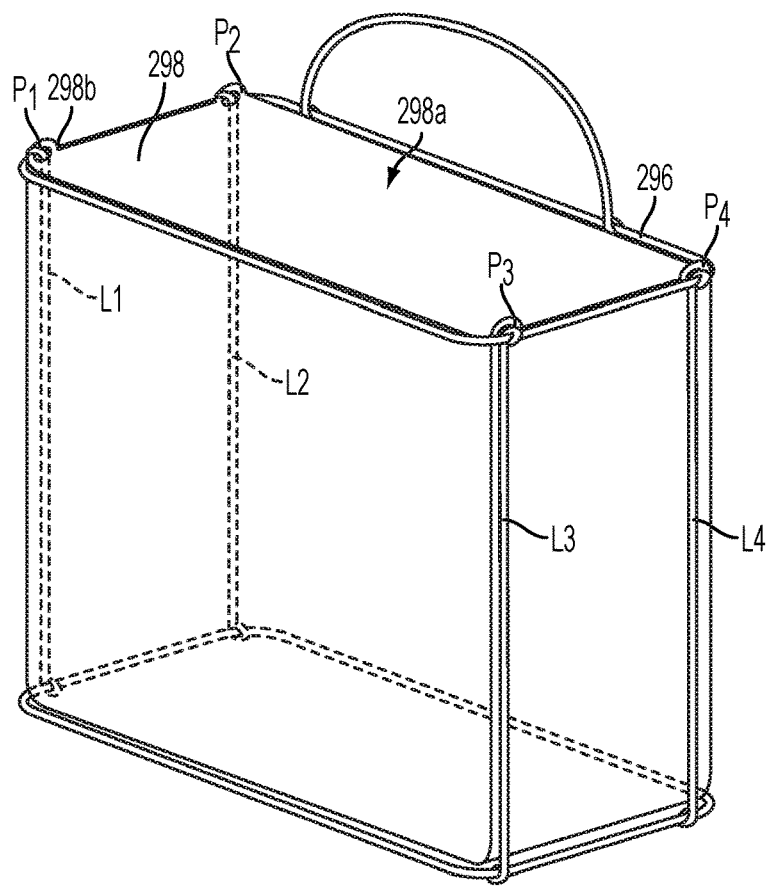
FIG. 31 is a perspective view of another embodiment of filter and frame for assembling the filter.

FIG. 31 shows an embodiment of a frame 296 to which an unassembled filter material (e.g., in the form of one or more separate panels of fabric) may be removably attached to form an assembled filter 298 having an internal filter cavity 298a wherein macerated food stuff may be deposited. The frame may take any desired form. In FIG. 31, the frame is in the form of an open wire frame having four legs L1-L4 with respective posts P1-P4 for removably attaching the top edge 298b of the filter 298. The frame and filter may be filled outside or inside the pressing chamber with the frame being removed and while leaving the assembled and filled filter inside the pressing chamber prior to a pressing operation.

Figure 32:
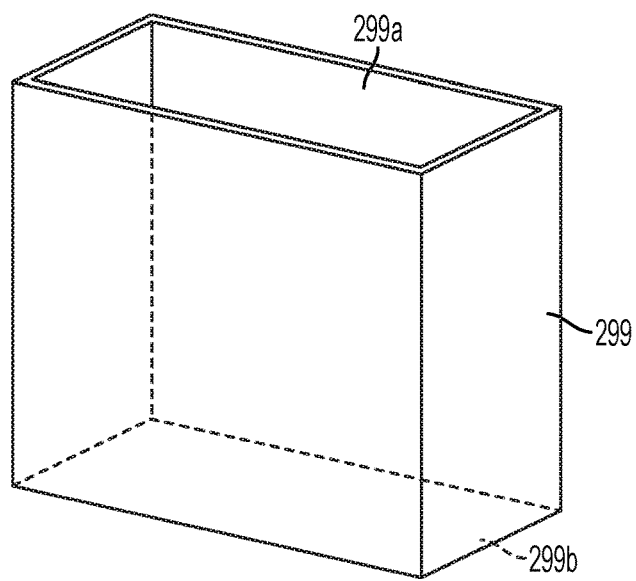
FIG. 32 is a perspective view of a rigid single neck funnel.
Figure 33:
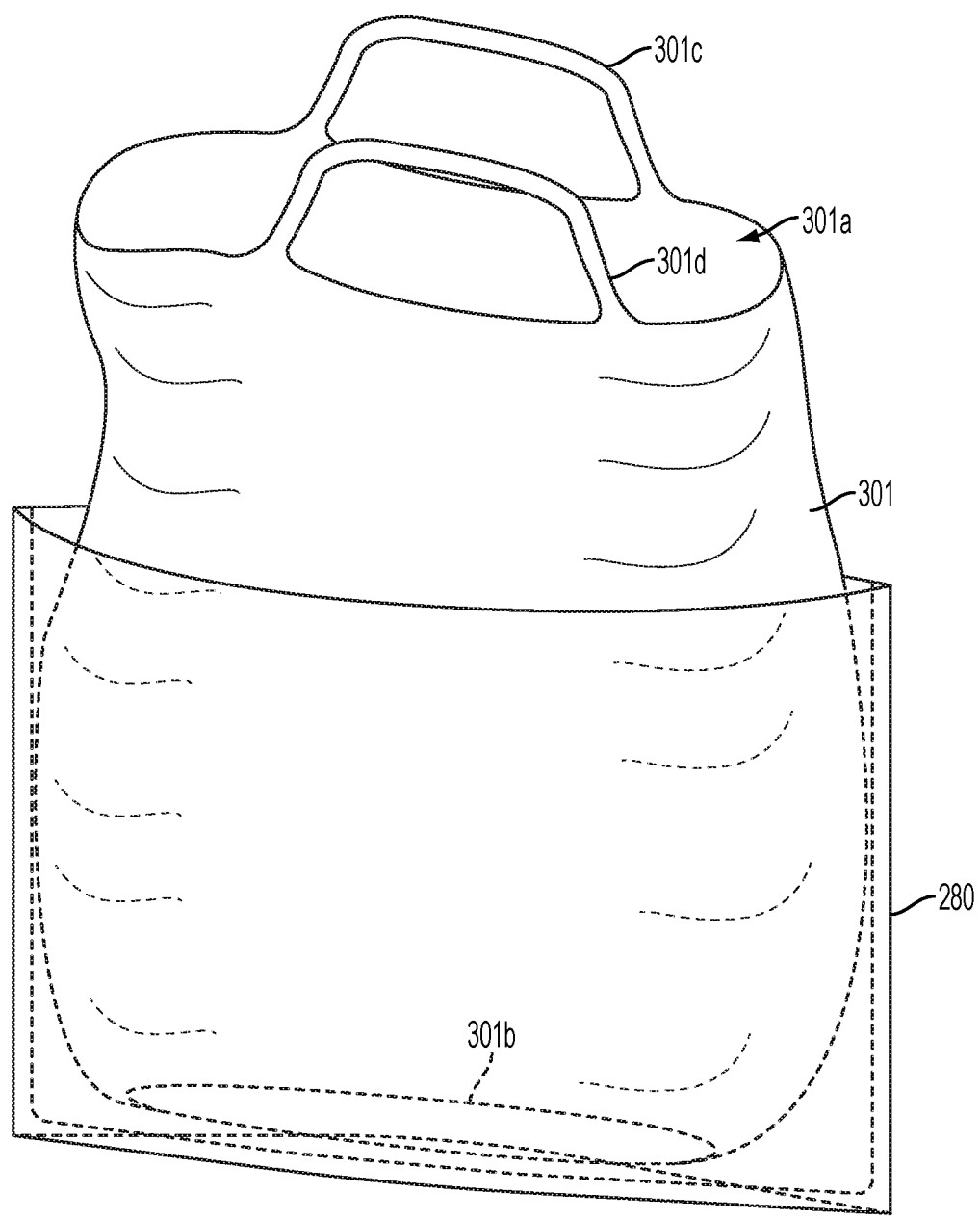
FIG. 33 is a perspective view of a flexible single neck funnel with a handle with the funnel neck shown inside a filter.

FIG. 32 shows a single funnel neck 299 which is formed of a rigid material and includes an open top 299a and open bottom 299b. FIG. 33 shows a single funnel neck 301 which is formed of a flexible material and includes an open top 301a and open bottom 301b. Handles 301c and 301d may be provided adjacent open top 301a if desired.

FIGS. 34A-38 show yet another embodiment of the present invention. A shredder or grinder (not shown) may be included if desired. As shown the machine is meant to hold approximately 12 to 15 lbs. of shredded matter in total prior to squeezing. The housing and other parts shown in FIG. 1 may be used for this embodiment.

Figure 34A:
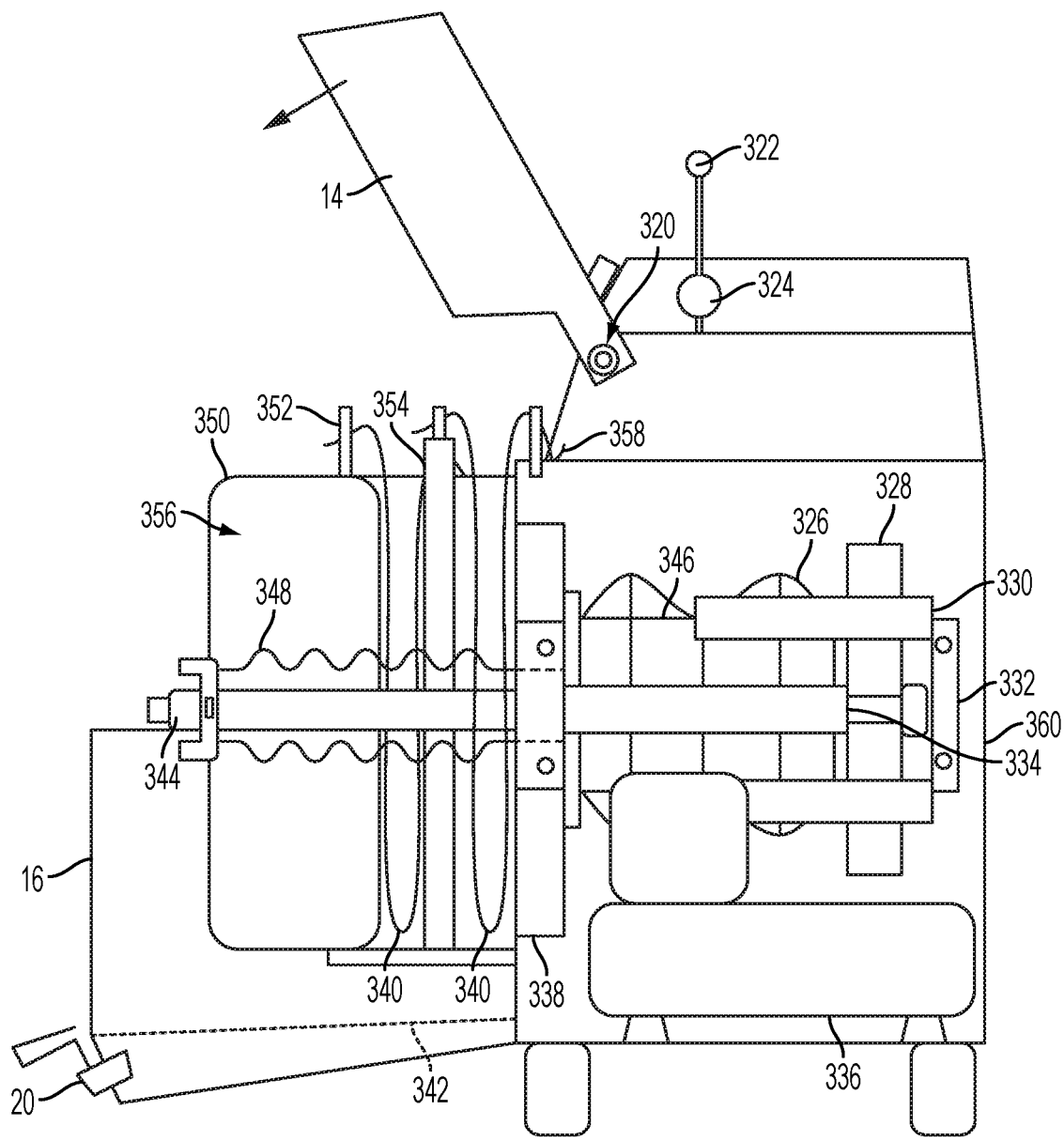
FIG. 34A is a side elevational view of another embodiment of juice pressing machine with some parts being omitted for purposes of clarity and the platen in a partially extended position.
Figure 34B:
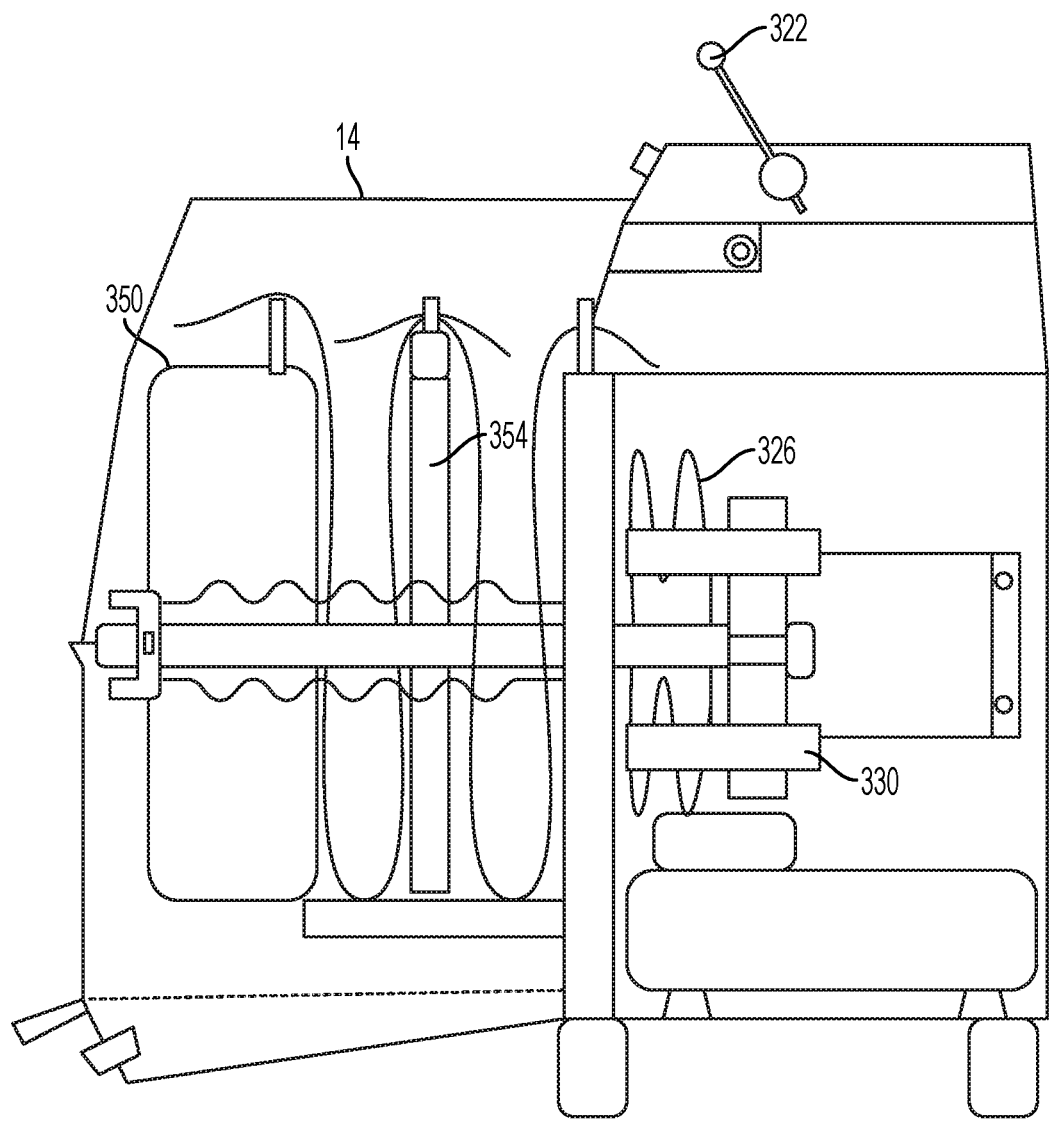
FIG. 34B is the view of FIG. 34A with the platen in the retracted filter-loading position.
Figure 34C:
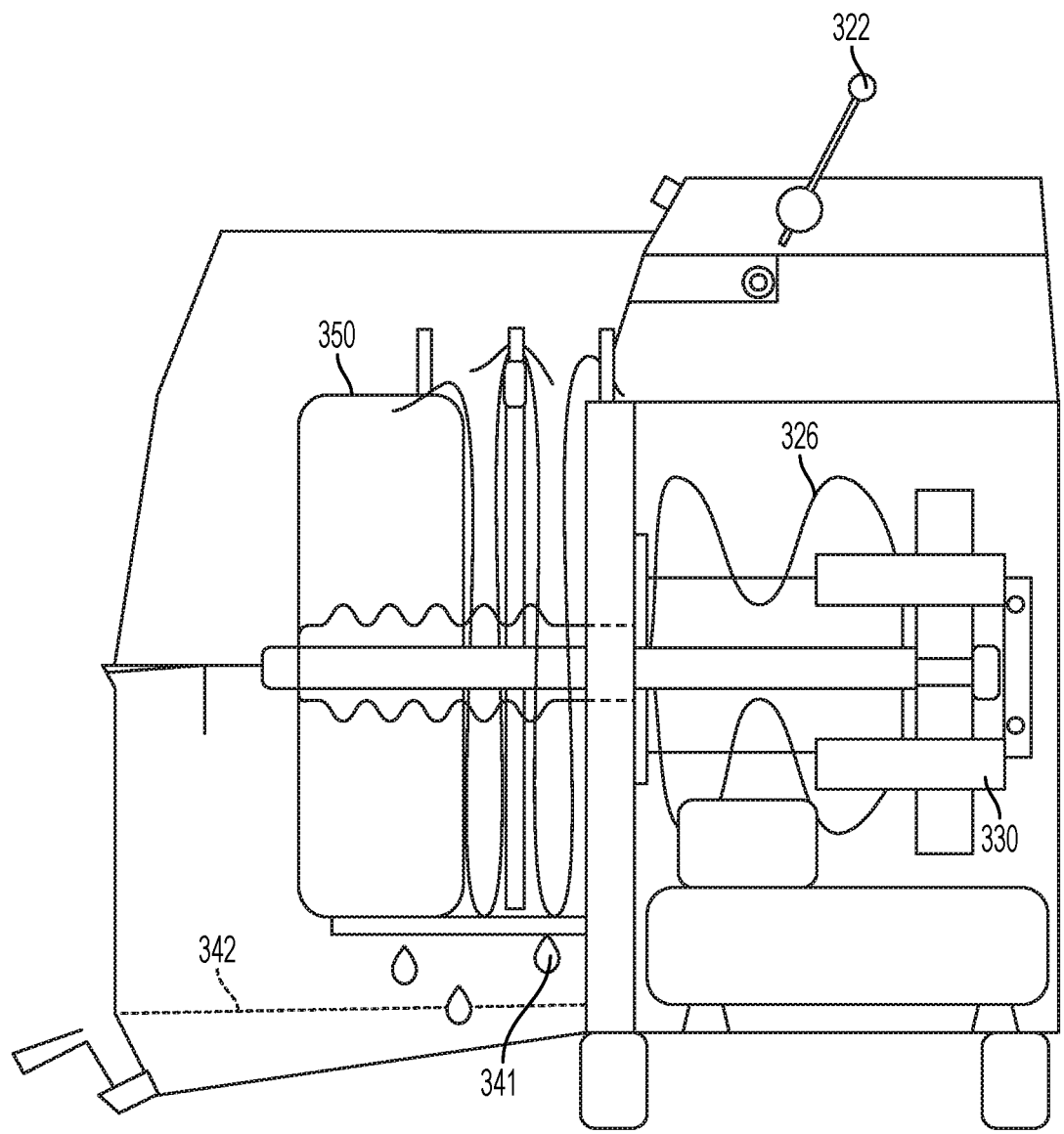
FIG. 34C is the view of FIG. 34A with the platen in the fully extended position juice pressing position.
Figure 35:
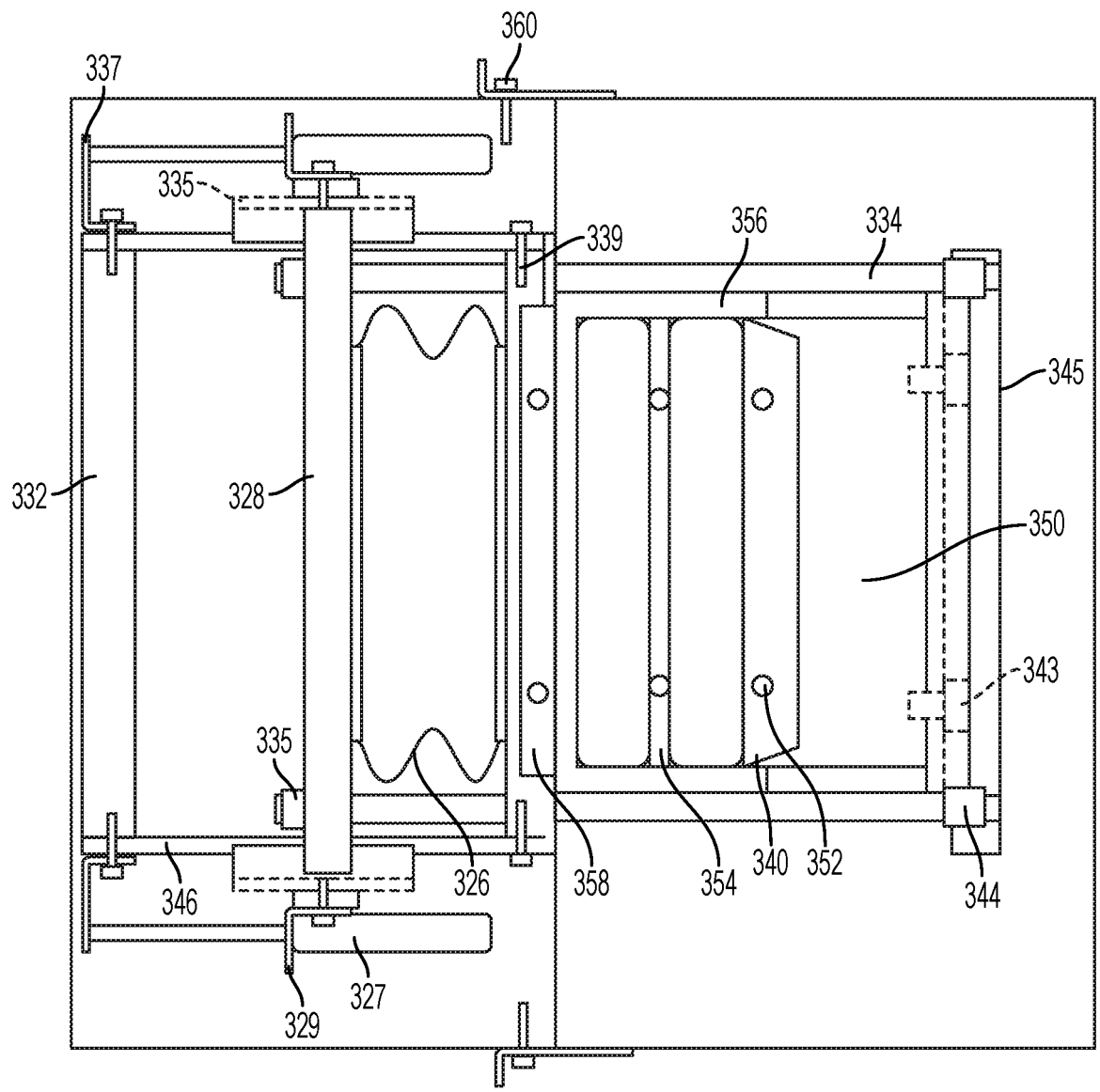
FIG. 35 is a top plan view thereof.
Figure 36:
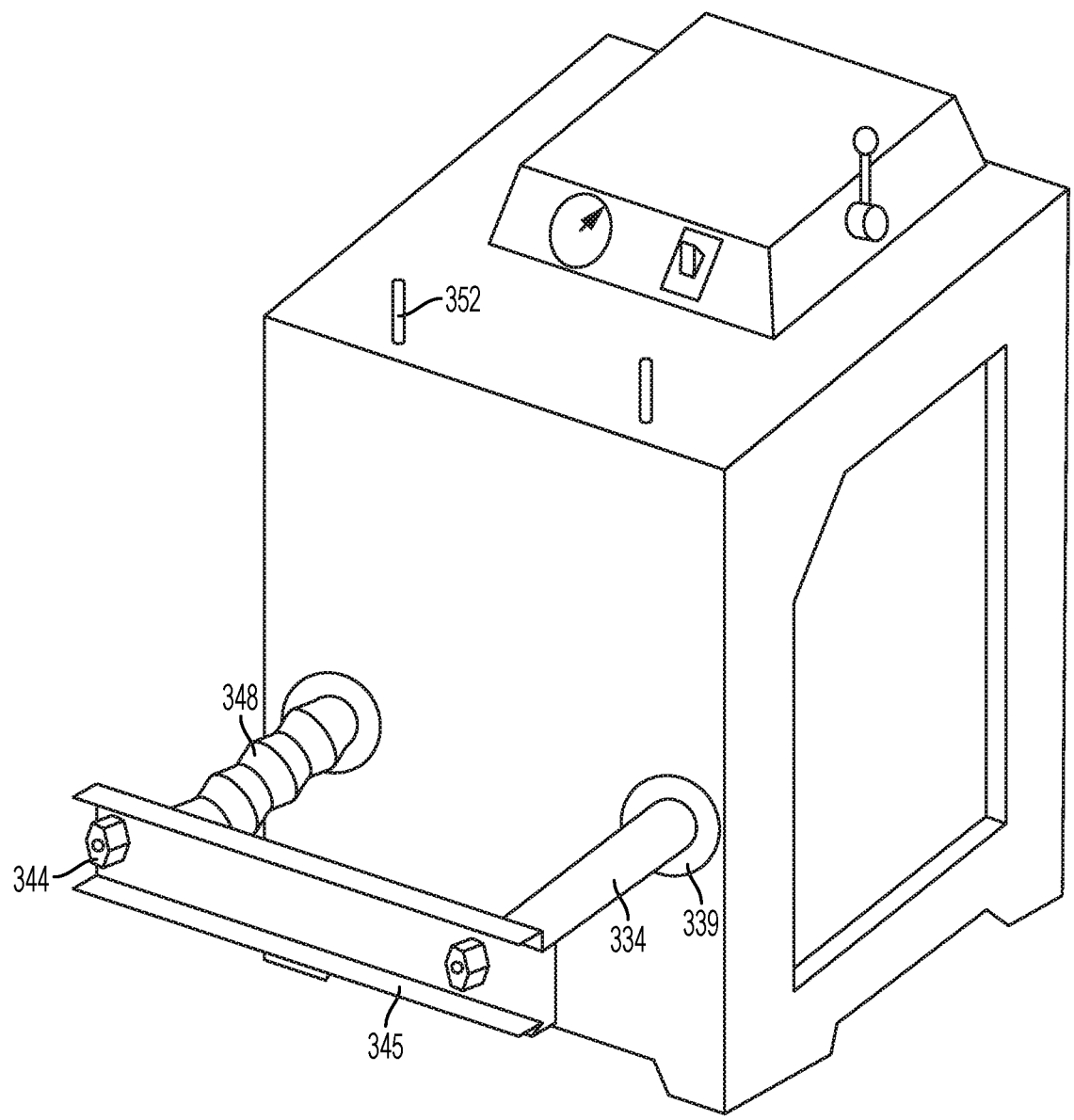
FIG. 36 is a perspective view thereof showing the food contacting parts removed for cleaning.
Figure 37:
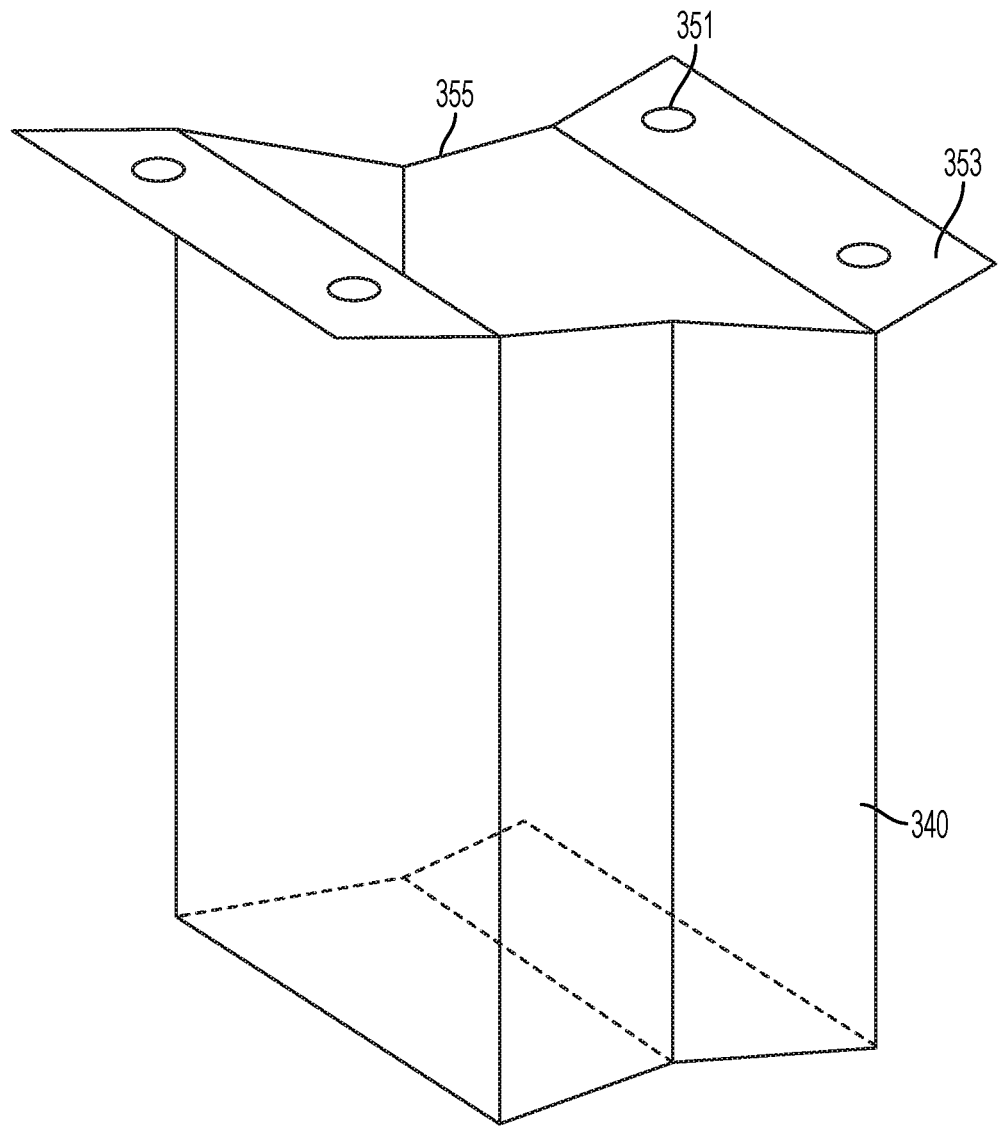
FIG. 37 is a perspective view of the paper press bag for use with the embodiment of pressing machine of FIGS. 34A-38.

FIGS. 34A-C show the working components in a side view and in FIG. 35 in a top view. A hinge 320 for the safety cover is shown along with valve handle 322 and air directional valve 324 which is rotated for compressing, or opening the press platen. The actual compression force is generated by air actuator 326, which is firmly mounted to rigid plate 338, and moveable plate 328. Moveable plate 328 is guidable via rigid side plates 346 on each side and the moving guides 330 and 331 which glide along the side plates in plastic shims 333 and 335. The actuator is interconnected via pneumatic tubing (not shown) with an air compressor 336.

The air compressor is also connected via pneumatic tubing with two small pneumatic cylinders 327.

Two rods 334, one on each side, are firmly attached to the moving plate 328 with nuts 329. These two rods extend through holes in the housing into the squeezing area, attaching to the press platen 350 via structural channel 345 by threaded nuts 344, one for each rod 334.

Press platen 350 is constrained by side plates 356, and chamber bottom, 357, and can move slideably along 356 and 357. The press platen is loosely held to a channel, 345, by 2 panhead bolts, 343, which engage key-slots in the channel 345 for easy removal. The press platen 50 does not come in contact with the raw produce, but rather a foraminous material like cloth or paper bags, shown here as 340. Note that there are two such bags shown, 340, which are separated by a freely moveable rigid press-rack, 354, which is also constrained by side plates 356 and chamber bottom 357 slideably against rigid chamber wall 339.

Figure 38:
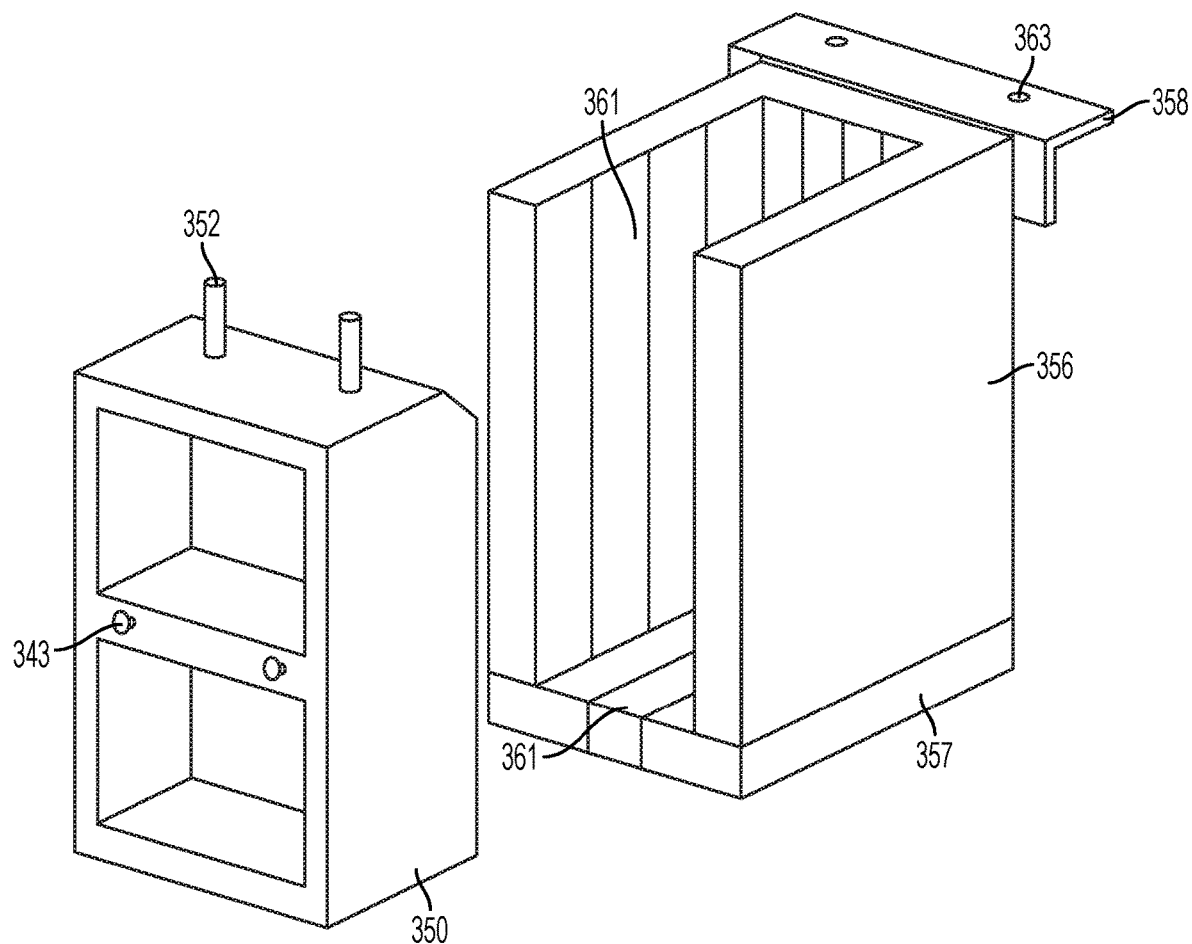
FIG. 38 is a perspective view of the platen and pressing chamber thereof.

In order to aid drainage of juice from the bags, the face of platen 350 and chamber wall 339, as well as side plates 356 and chamber bottom 357 are grooved as shown in FIG. 38.

The entire press assembly composed of 350, 356, 357, 339, and press rack 354, are all hung from pins 359 by means of metal bracket, 358, which is attached to 339 permanently. Hence the entire press assembly, as just described is easily lifted from the machine for cleaning.

As stated above, the shredder or grinder portion is not part of any of the inventive juicing machines disclosed herein although one may of course be added if desired. Without having a preinstalled, specific grinder on the machine itself, many different types of foodstuff may be macerated by using any shredder style of choice. This invention is meant to squeeze the juice out of previously shredded materials; there are so many types of food processors and choppers on the market today that the operator has a wide choice of machines, most significantly are already found in most commercial kitchens or food prep areas. But even more important it has been found from experience that the combination of a totally separate shredder and press allow more efficient use of operator time, since the two functions of shredding and pressing can now be performed simultaneously. There is no longer any need for the press to wait for the shredder to do its job, nor for the shredder to wait until the press is finished pressing, two delays that are always encountered when the shredder is mounted atop the press as is included in some prior art machines (and also many current juicers made for home use).

Another improvement found in this new invention is the protective support of the filter bag in every plane and direction that is closed and subject to pressure, thus obviating the need for a strong press bag, even allowing the use of paper as the bag material. These and other improvements will be explained in the detailed description and figures.

Another improvement found in this new invention is the ability to press multiple bags at the same time permitting the use of much lighter-gage materials and components, because by using several more narrow bags, rather than one wide one, the surface area of the platen, hence the squeezing force (area x pressure) necessary to be generated by the squeezing apparatus is much reduced.

U.S. Pat. No. 5,207,152 shows a design for a compact all-in-one juice machine and shredder which was meant to combine all the functions of a hydraulic juice press, commonly referred to in the art as "cold pressing" and was meant for use in a supermarket environment. Although it represented a significant reduction in size and weight over the floor model X-1 press it still, at 240 lbs required 2 strong men to lift it onto a table or countertop and in use required a stand upon which it rested. Having a width of 36 inches and a depth of 36 inches it did not lend itself to the "juice bar" use where counter space is extremely limited. When sitting on a counter it also represented a relatively long reach from the operator to feed the shredder mechanism which was part of the unit.

In the present invention the size and weight of a juice press has been reduced while still retaining the virtues of a true "press" with the ability to exert up to 50 psi or more on the material being juiced. At the same time the press needs to pass all modern safety standards and sanitation standards for the modern food kitchen (such as National Sanitation Foundation Standards). Modern sanitation guidelines require among other things, easy removal of all food contact components without the use of tools for cleaning in a standard 3 bay kitchen sink. These components need to be small enough and light enough to be easily lifted by one person for removal for cleaning in a sink.

Method of Operation

In order to describe the machine of FIGS. 34A-38, it is helpful to show the typical operation for which this embodiment was intended.

Detailed steps of operation:

To begin the pressing operation, the press must be loaded with shredded material to be juiced. To do this the operator moves the valve handle, 322, manually to the "OPEN" or "Retract" position. This pneumatic valve allows compressed air to move from the air compressor, 336, through pneumatic tubing (not shown) to the two small pneumatic cylinders, 327, causing them to extend, one being located on each side of the machine. At the same time the valve allows any air still remaining in the primary pneumatic actuator, 326, to exhaust to the atmosphere. In so doing the moveable platen, 328, moves towards the fixed platen, 338, which forces the primary actuator, 326, to its most collapsed position, shown clearly in FIG. 34B. This movement also forces the pressing platen, 350, to extend fully, thus opening the pressing chamber, into which the filter bags, 340, can be placed by the operator.

Once step one has been completed, the operator must open the safety cover, 332, in order to gain access to the pressing chamber itself. In any position but the fully closed position this safety cover interrupts all electrical power to the compressor, 336, and vents all pressurized air to the atmosphere. Thus it is impossible for the press to operate with the cover open.

Once opened, the operator places one or more filter bags in position, as shown in FIG. 34 with one press rack, 354, placed between every 2 adjacent bags. Pins, 352, assisting attachment of the bags by holding the bags open and in position for filling.

Filling of the bags is now rapidly accomplished by manually loading or pouring the shredded mash into the bags, until all the bags are approx. ⅔ full.

Once the bags are filled, the safety cover is closed, as shown in FIG. 1, and the hand valve, 322, is moved to the "CLOSE" or "PRESS" position. This exhausts air from the two retract cylinders, 327, and permits air to move into the primary pneumatic actuator, 326. As the air pressure begins to rise due to operation of the air compressor, 336, the primary actuator begins to move to its fully extended position, shown in FIG. This motion pulls the two rods, 334, which are attached swivelably to the channel, 45, which forces the pressing platen, 350, towards the fixed receiving chamber, 356, thus exerting force on the filter bags, 340, which begins to force juice out of the shredded organic material. This juice is filtered through the bags, and drips into the juice collection pan 16 where it accumulates during the pressing operation. Note that at any time juice may be drained from this pan through operation of spigot 20 (see FIG. 1). As the pressure rises, more force is exerted on the shredded material in a gradually increasing fashion.

Once the maximum pressure is reached, or alternately, when a certain time has elapsed, the hand valve is moved back to the "RETRACT" position, and the actions of step 4 are reversed.

The safety cover is opened, and the filter bags, with their compressed contents are removed for disposal or are emptied by turning them upside down, and reused.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A juicing machine configured to express juice from a foodstuff, the juicing machine comprising:
   a frame comprising a press chamber well, the press chamber well having a top opening;
   a press chamber received in the press chamber well, the press chamber comprising:
   a first side wall;
   a second side wall opposite the first side wall;
   a back wall;
   an open front opposite the back wall;
   a bottom wall;
   an open top opposite the bottom wall; and
   an interior space that is configured to receive the foodstuff through the open top;
   wherein the press chamber is removable from the press chamber well by being passed through the top opening;
   a platen configured to be received through the open front of the press chamber; and
   an actuator configured to drive the platen toward the back wall of the press chamber;
   the juicing machine configured such that, during driving of the platen toward the back wall pressing chamber, the foodstuff received in the interior space of the press chamber is compressed between the back wall of the press chamber and the platen, thereby expressing juice from the foodstuff.

2. The juicing machine of claim 1, wherein the actuator is pneumatically powered.

3. The juicing machine of claim 1, wherein the actuator is configured to restrict tilting of the platen about a horizontal axis.

4. The juicing machine of claim 1, wherein the press chamber further comprises first and second shoulders that are configured to engage with the first and second side walls, respectively.

5. A juicing machine comprising:
   a frame comprising a press chamber well, the press chamber well having a top opening;
   a press chamber received in the press chamber well, the press chamber comprising:
   a first side wall;
   a second side wall opposite the first side wall;
   a back wall;
   an open front opposite the back wall;
   a bottom wall;
   an open top opposite the bottom wall; and
   an interior space that is configured to receive a foodstuff through the open top;
   a platen positioned in the press chamber, the platen configured to move relative to the press chamber; and
   an actuator removably connected to the platen, the actuator configured to drive the platen toward the back wall of the press chamber;
   wherein the press chamber and the platen together form an assembly that is configured to be removed from the press chamber well.

6. The juicing machine of claim 5, wherein the assembly is configured to be removed from the press chamber well by passing through the top opening.

7. The juicing machine of claim 5, wherein the platen comprises a tapered recess and the actuator comprises a rod with a tapered end, and wherein the actuator is removably connected to the platen via mating engagement of the tapered end of the actuator being received in the tapered recess of the platen.

8. The juicing machine of claim 7, wherein the tapered recess and the tapered end comprise corresponding truncated cones.

9. The juicing machine of claim 5, wherein the actuator is pneumatically powered.

10. The juicing machine of claim 5, wherein the actuator is configured to restrict tilting of the platen about a horizontal axis.

11. The juicing machine of claim 5, wherein the press chamber further comprises first and second shoulders that are configured to engage with the first and second side walls, respectively.

12. The juicing machine of claim 5, wherein the platen further comprises opposite first and second side edges that abut the first and second side walls of the press chamber.

13. The juicing machine of claim 5, wherein the bottom wall is removably connected to the first and second side walls.

14. The juicing machine of claim 5, wherein:
   the first and second side walls of the press chamber comprise horizontal fluid pathways; and
   at least one of the platen and the back wall comprises vertical fluid pathways.

15. The juicing machine of claim 14, wherein the horizontal fluid pathways comprise grooves.

16. The juicing machine of claim 5, further comprising:
   a disposable mesh filter positioned in the interior space of the press chamber, the disposable mesh filter comprising a liquid permeable filter material having a predetermined tensile strength, the disposable mesh filter configured to receive the foodstuff and to allow juice expressed from the foodstuff to pass through, the mesh filter further configured to engage the platen such that the mesh filter includes unsupported sections that span the plurality of fluid pathways;
   wherein the juicing machine is configured to apply, during a juicing operation, a pressing force of a predetermined magnitude against the foodstuff in the disposable mesh filter in a direction normal to the platen; and
   wherein the predetermined magnitude of the pressing force, the predetermined tensile strength of the filter material, and the size of the unsupported sections are such that a resulting tensile force on the unsupported sections of the filter material is less than the predetermined tensile strength of the filter material.

17. The juicing machine of claim 16, wherein the filter comprises a first panel and a second panel, and the juicing machine is configured to express the juice from the foodstuff with no juice having to travel more than about one inch to reach either of the first and second panels.

18. The juicing machine of claim 16, wherein the press chamber is removable from the press chamber well by being passed through the top opening.

19. The juicing machine of claim 16, wherein the assembly is configured to be removed from the press chamber well through the top opening.

20. The juicing machine of claim 16, wherein the press chamber and platen support a front, rear, left side, right side, and bottom of the mesh filter during the juicing operation.

21. The juicing machine of claim 16, wherein the juicing machine is configured such that the mesh filter does not rupture during the juicing operation.

* * * * *